(12) United States Patent
Moisey et al.

(10) Patent No.: US 7,231,024 B2
(45) Date of Patent: Jun. 12, 2007

(54) METHODS, SYSTEMS, AND COMPUTER PROGRAM PRODUCTS FOR SELECTING OR GENERATING A SINGLE CALL DETAIL RECORD (CDR) FROM A PLURALITY OF CDRS ASSOCIATED WITH A CALL HAVING A PLURALITY OF LEGS

(75) Inventors: Kenneth A. Moisey, Morrisville, NC (US); Clifton D. Petteway, Apex, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/156,997

(22) Filed: Jun. 20, 2005

(65) Prior Publication Data

US 2005/0281399 A1 Dec. 22, 2005

Related U.S. Application Data

(60) Provisional application No. 60/581,218, filed on Jun. 18, 2004.

(51) Int. Cl.
*H04M 15/00* (2006.01)

(52) U.S. Cl. ............ 379/126; 379/114.01; 379/115.01; 379/133

(58) Field of Classification Search ........... 379/112.01, 379/114.01, 114.28, 116, 119, 121.04, 121.05, 379/125, 126, 127.01, 133, 134
See application file for complete search history.

(56) References Cited

U.S. PATENT DOCUMENTS

| 3,917,915 A | 11/1975 | Karras |
| 4,162,377 A | 7/1979 | Mearns |
| 4,191,860 A | 3/1980 | Weber |
| 4,310,727 A | 1/1982 | Lawser |
| 4,313,035 A | 1/1982 | Jordan et al. |
| 4,385,206 A | 5/1983 | Bradshaw et al. |
| 4,457,729 A | 7/1984 | Peerlkamp |

(Continued)

FOREIGN PATENT DOCUMENTS

| EP | 0 088 639 | 9/1983 |
| EP | 0 212 654 | 5/1987 |
| EP | 0 258 654 | 3/1988 |
| EP | 0 264 023 | 4/1988 |
| JP | 58215164 | 12/1983 |
| JP | 62200859 | 9/1987 |
| WO | WO 84/01073 | 3/1984 |
| WO | WO 86/03915 | 7/1986 |
| WO | WO 88/00419 | 1/1988 |
| WO | WO 01/20920 | 3/2001 |

OTHER PUBLICATIONS

ANONYMOUS, "A New Network," TE&M, (Dec. 1, 1988).

(Continued)

*Primary Examiner*—Quoc Tran
(74) *Attorney, Agent, or Firm*—Jenkins, Wilson, Taylor & Hunt, P.A.

(57) ABSTRACT

Methods, systems, and computer program products for selecting or generating a single call detail record (CDR) from a plurality of CDRs associated with a call that includes a plurality of legs are disclosed. According to one aspect, a CDR selection/consolidation function may analyze CDRs for calls that involve a plurality of legs and select a representative CDR for the call. The selected CDR is provided to a network services application. According to another aspect, the CDR selection/consolidation function may locate a plurality of CDRs associated with a multi-leg call and produce a single consolidated or "blended" CDR that is representative of the call. The consolidated CDR may contain information from some or all of the multiple CDRs.

48 Claims, 11 Drawing Sheets

U.S. PATENT DOCUMENTS

| | | | |
|---|---|---|---|
| 4,756,020 | A | 7/1988 | Fodale |
| 4,769,834 | A | 9/1988 | Billinger et al. |
| 4,788,718 | A | 11/1988 | McNabb et al. |
| 4,897,835 | A | 1/1990 | Gaskill et al. |
| 4,897,870 | A | 1/1990 | Golden |
| 4,959,849 | A | 9/1990 | Bhusri |
| 4,972,461 | A | 11/1990 | Brown et al. |
| 5,008,929 | A | 4/1991 | Olsen et al. |
| 5,150,357 | A | 9/1992 | Hopner et al. |
| 5,291,481 | A | 3/1994 | Doshi et al. |
| 5,315,580 | A | 5/1994 | Phaal |
| 5,402,474 | A | 3/1995 | Miller et al. |
| 5,426,688 | A | 6/1995 | Anand |
| 5,430,709 | A | 7/1995 | Galloway |
| 5,438,570 | A | 8/1995 | Karras et al. |
| 5,473,596 | A | 12/1995 | Garafola et al. |
| 5,475,732 | A | 12/1995 | Pester, III |
| 5,506,893 | A | 4/1996 | Buscher et al. |
| 5,521,902 | A | 5/1996 | Ferguson |
| 5,539,804 | A | 7/1996 | Hong et al. |
| 5,579,371 | A | 11/1996 | Aridas et al. |
| 5,592,530 | A | 1/1997 | Brockman et al. |
| 5,606,600 | A | 2/1997 | Elliott et al. |
| 5,712,908 | A | 1/1998 | Brinkman et al. |
| 5,768,352 | A | 6/1998 | Elliott et al. |
| 5,774,532 | A | 6/1998 | Gottlieb et al. |
| 5,784,443 | A | 7/1998 | Chapman et al. |
| 6,028,914 | A * | 2/2000 | Lin et al. ................ 379/133 |
| 6,108,782 | A | 8/2000 | Fletcher et al. |
| 6,111,946 | A | 8/2000 | O'Brien |
| 6,134,307 | A | 10/2000 | Brouckman et al. |
| 6,137,869 | A | 10/2000 | Voit et al. |
| 6,249,572 | B1 * | 6/2001 | Brockman et al. ........ 379/133 |
| 6,327,350 | B1 | 12/2001 | Spangler et al. |
| 6,891,938 | B1 * | 5/2005 | Scott et al. ............ 379/112.06 |
| 6,968,048 | B2 * | 11/2005 | Moisey et al. ......... 379/114.01 |
| 2005/0111640 | A1 | 5/2005 | Moisey et al. |

OTHER PUBLICATIONS

ANONYMOUS, "Independent SS7 Network Questions and Answers," (Aug. 2, 1988).
ANONYMOUS, "Independent SS7 Network SSP Solutions," (May 2, 1988).
ANONYMOUS, "Intelligent Networking: CCS7 Message Detail Recording Enables Usage-Sensitive Billing at Gateway DMS-STPs," p. 4-5, (Jul. 2, 1990).
ANONYMOUS, "Operations, Maintenance and Administration Part (OMAP)," International Telecommunications Union, p. 485-531, ( Jul. 27, 1999).
ANONYMOUS, "Systems Engineering Requirements for the 1ESS Switch Automatic Message Account Transmitter (AMAT)," Telcordia Technologies, Inc., (Abstract Only) (Nov. 2, 1985).
Bellcore, "Generic Requirements for Common Channel Signaling (CCS) Network Usage Measurement Functionality," Technical Advisory, p. 1-76, (Dec. 2, 1992).
Bellcore, "Request for Industry Input: Extending a Signal Transfer Point Adjunct Beyond Usage/Billing Measurements," Digest, p. 33, (Jun. 2, 1992).
Blake, "Fast, Smart and In Control Signaling System 7 is Helping Bring The Intelligent Network to the End User," In Perspective, p. 20-23, ( May 2, 1993).
Buckles, "SS7 Gateways Serve and Protect," Telephony, p. 39-41, 44, (Nov. 20, 1989).
Danar Corporation, "About Syzgy," (Downloaded Jul. 14, 1999).
Data Gulper, "Load your data warehouse 10 times faster. Concurrently load up to 500+ online feeds. Filter out useful data and store it quickly," Compendium Research Corporation, (May 2, 1998).
Federal Communications Commission, "Notice of Inquiry," Federal Communications Commission, (Dec. 6, 1991).
General Signal Networks, "SS7 Performance Management System," www.gsnetworks.com/powerof7/index.html (Downloaded Jul. 18, 1999).
Hanley, "Fight for the Future: Test Vendors Try To Get The Edge On Unstandarized Technology With Flexible, Forward-Thinking Products," Telephony, p. 52-54, (Mar. 8, 1999).
Hayward, "Traffic Engineering in a New competitive Environment," Elsevier Science Publishers B.V., p. 1112-1116, (May 24, 1985).
Hester, "Can You Afford To Be Without SS7 Network Surveillance," Telephony, (Dec. 3, 1990).
Hewlett Packard, "HP acceSS7 Signaling Monitoring System", Hewlett Packard Co., (May 2, 1995).
Hilton et al., "Common Channel Signaling for Independents," TE&M, (Jun. 15, 1988).
Homisco/Voicenet Inc., "Features," www.homisco.com/SS7/page7.html (Downloaded Jul. 14, 1999).
Kritzmacher et al., "Recommendations for SS7 Reliability," TE&M, p. 35-36, 38, (Nov. 1, 1992).
Lanning, "SS7 Interconnection Awaits Green Light," Telephony's Transmission Special, p. 32, 34, (Nov. 2, 1990).
Marshall, "Maintaining the CCS Network," TE&M, p. 78-80, (Nov. 1, 1988).
Parsons, "A800: A Decision to Remain Independent," p. 1-4, (May 2, 1988).
Parsons, "Update: Financial Considerations and Network Control Most Important for Independent Telcos Examining SS7," p. 1-4, (Aug. 2, 1988).
Protocol Technologies, "#7 MGTS Monitor Trap Overview," MGTS User's Guide p. 5.9.0-5.9.36 (Dec. 2, 1987).
Protocol Technologies, "Protocol Technologies User's Guide: Message Generator/Traffic Simulator," p. 1-1-8-2, (Apr. 2, 1987).
Protocol Technologies, "Template Trap And Trace," p. 7-1-7-52, (Feb. 2, 1989).
Rusin, "Voice Processing And The Intelligent Network," TE&M, p. 51-68, (Mar. 1, 1989).
Stusser, "Call Accounting Needs Five New Features," Business Communication Review, p. 45-48, (Sep. 28, 1988).
Szybicki, "Adaptive, Tariff Dependent Traffic Routing And Network management in Multi-Service Telecommunications Networks," Elsevier Science Publisher B.V., p. 614-621, (Sep. 4-11, 1985).
Tekelec, "Common Channel Signaling System 7 Link Monitoring," Response to Request for Proposal from Southwestern Bell Telephone (Jul. 2, 1993).
Tekelec, "Eagle STP: STP-LAN Interface Feature ," (May 2, 1997).
Tekelec, "IDS Enhanced Gateway Billing System User's Manual," (Jan. 22, 1992).
Tekelec, "Intelligent Database Services Billing System User's Manual," p. 1-1-2-18, (Apr. 2, 1991).
Tekelec, "Proposal for MCI Billing System," (Nov. 2, 1993).
Telcordia Technologies, "A Framework of High-Level Requirements and Considerations for Common Channel Signaling Network Usage Measurements to Support Billing and Bill Verification," Framework Technical Advisory, p. 1-40, A-1-R-4, (Jan. 2, 1990).
Wavtek Wandel Goltermann, "8620 SS7 Signaling Surveillance System," Switching Test Solutions AG, (Jun. 15, 1999).

* cited by examiner

METHODS, SYSTEMS, AND COMPUTER PROGRAM PRODUCTS FOR SELECTING OR GENERATING A SINGLE CALL DETAIL RECORD (CDR) FROM A PLURALITY OF CDRS ASSOCIATED WITH A CALL HAVING A PLURALITY OF LEGS

RELATED APPLICATIONS

This application claims the benefit of U.S. provisional patent application No. 60/581,218, filed Jun. 18, 2004, the disclosure of which is incorporated herein by reference in its entirety.

TECHNICAL FIELD

The subject matter described herein includes methods, systems, and computer program products for generating and correlating call detail record (CDRs) associated with a call in a communications network. More particularly, the subject matter described herein includes methods, systems, and computer program products for methods, systems, and computer program products for selecting or generating a single call detail record (CDR) from a plurality of CDRs associated with a call having a plurality of legs.

RELATED ART

Monitoring systems have been deployed in telecommunications networks to produce call detail records (CDRs) which may be used by applications such as billing, billing verification, fraud detection, etc. In a signaling system 7 (SS7) environment, a CDR is typically generated based on one or more SS7 message signaling units (MSUs). An MSU, such as an ISDN user part (ISUP) initial address message (IAM), contains message transfer part (MTP) information. MTP information may include an origination point code (OPC) value, a destination point code (DPC) value, and a trunk circuit-identification code (CIC) value. When monitoring a network environment involving multiple switches, including tandem switches, a monitoring system will produce CDRs for each unique OPC-DPC-CIC encountered (e.g., via ISUP IAM messages) in the underlying network environment. As such, a CDR will be produced for each "leg" of a multi-leg call in the monitored network environment, as indicated in FIG. 1.

FIG. 1 illustrates an exemplary SS7 network environment 100, which includes a first end office (EO) 102, a first tandem office 104, a second tandem office 106, and a second EO 108. First EO 102 serves a calling party subscriber B. EO 108 serves a called party subscriber A. Network environment 100 includes a monitoring system 110, which is receives CDR information from several signaling link monitoring probes, 112, 114, and 116. More particularly, monitoring probe 112 monitors SS7 MSU traffic between EO 102 and tandem 104 and generates associated CDR information. Likewise, probe 114 generates CDR information associated with monitored SS7 MSU traffic between tandem 104 and tandem 106, and monitoring probe 116 generates CDR information associated with monitored SS7 MSU traffic between tandem 106 and EO 108. Monitoring system 110 receives and stores the CDR information from each remote monitoring probe and provides the CDR information to other applications that require such CDR information (e.g., billing applications, fraud detection applications, etc.).

In the example illustrated in FIG. 1, when calling party B dials the telephone number associated with called party A, originating EO 102 signals tandem office 104 with ISUP IAM message 1. Tandem office 104 in turn signals tandem office 106 with IAM message 2, and tandem office 106 signals the terminating EO 108 with IAM message 3. Remote monitor 112 generates a CDR associated with IAM message 1, remote monitor 114 generates a CDR associated with IAM message 2, and remote monitor 116 generates a CDR associated with IAM message 3. These three CDRs are communicated to central monitoring system 110, which in turn provides the three CDRs associated with the call from party B to party A to other applications that require such CDR information.

While the conveyance of multiple CDRs associated with the same call is required for some applications (e.g., QoS applications that report trunk group activity and need to receive each CDR associated with a multi-leg call setup/teardown), the presence of multiple CDRs for the same call presents a problem for those applications that require one and only one CDR per call. For example, in the case of billing and billing-related applications that require only one CDR per call, the presentation of multiple CDRs associated with a multi-leg call to these applications often results in over-reported network usage and/or erroneous billing. Accordingly, there exists a long-felt need for improved methods, systems, and computer program products for generating CDR information for a multi-leg call.

SUMMARY

According to one aspect of the subject matter described herein, a call detail record (CDR) selection/consolidation function analyzes a plurality of CDRs, including CDRs associated with multi-leg calls, and, for each multi-leg call, selects a representative CDR for the call. As used herein, the term "leg" refers to a bearer channel connection between two switching offices for a call. The CDR may be provided to network services applications including billing applications, billing verification applications, usage measurements applications, fraud detection applications, or presence service applications, where these applications require or expect a single CDR per call. In one implementation, a group of CDRs associated with a multi-leg call is identified and a single member of the group is selected. The single, retained CDR associated with the multi-leg call is then communicated to those applications that require a single CDR for each call.

In an alternate implementation, it is not necessary to identify CDRs associated with a multi-leg call. A single-CDR selection algorithm may be executed for a database of CDRs that include multiple CDRs for multi-leg calls and single CDRs for single-leg calls. The single CDR selection algorithm may select a single, representative CDR for each multi-leg call and eliminate or ignore the remaining CDRs for the multi-leg calls. The result of applying the single-CDR selection algorithm to a database of uncorrelated CDRs is a database with one CDR per call. Such a database may be useful to downstream applications, such as billing applications, that require a single CDR per call.

According to another aspect of the subject matter described herein, a CDR selection/consolidation function may identify a plurality of CDRs associated with a multi-leg call and produce a single consolidated or "blended" CDR that is representative of the call. The consolidated CDR may contain information from some or all of the CDRs. For example, a consolidated CDR may contain some or all of the information contained in one of the CDRs, as well as origination point code (OPC), destination point code (DPC), circuit identification code (CIC), generic address parameter (GAP), and jurisdiction information parameter (JIP) information associated with some or all of the remaining multiple CDRs. The single, consolidated CDR is then communicated to those applications that require a single CDR for each call.

Alternatively, multiple CDRs associated with the same call may be tagged or linked with a correlation parameter to indicate that they belong to the same call. For example, a hexadecimal value or ASCII text value may be inserted in each of the related CDR records to indicate their correlation to the same multi-leg call. The tagged or linked CDRs may be consolidated into a single "super" CDR record, which is then communicated to those applications that can receive and process such a consolidated multi-leg CDR record. Alternatively, each tagged CDR may be communicated to those applications that can receive and process tagged or linked multi-leg CDR sequences.

The subject matter described herein may be implemented using a computer program product comprising computer executable instructions embodied in a computer readable medium. Exemplary computer readable media suitable for implementing the subject matter described herein include disk memory devices, chip memory devices, application specific integrated circuits, programmable logic devices and downloadable electrical signals. In addition, a computer program product that implements the subject matter described herein may be located on a single physical device or may be distributed across a plurality of physical devices or computing platforms.

BRIEF DESCRIPTION OF THE DRAWINGS

Preferred embodiments of the subject matter will now be described with reference to the accompanying drawings of which.

DETAILED DESCRIPTION

Figure 1:
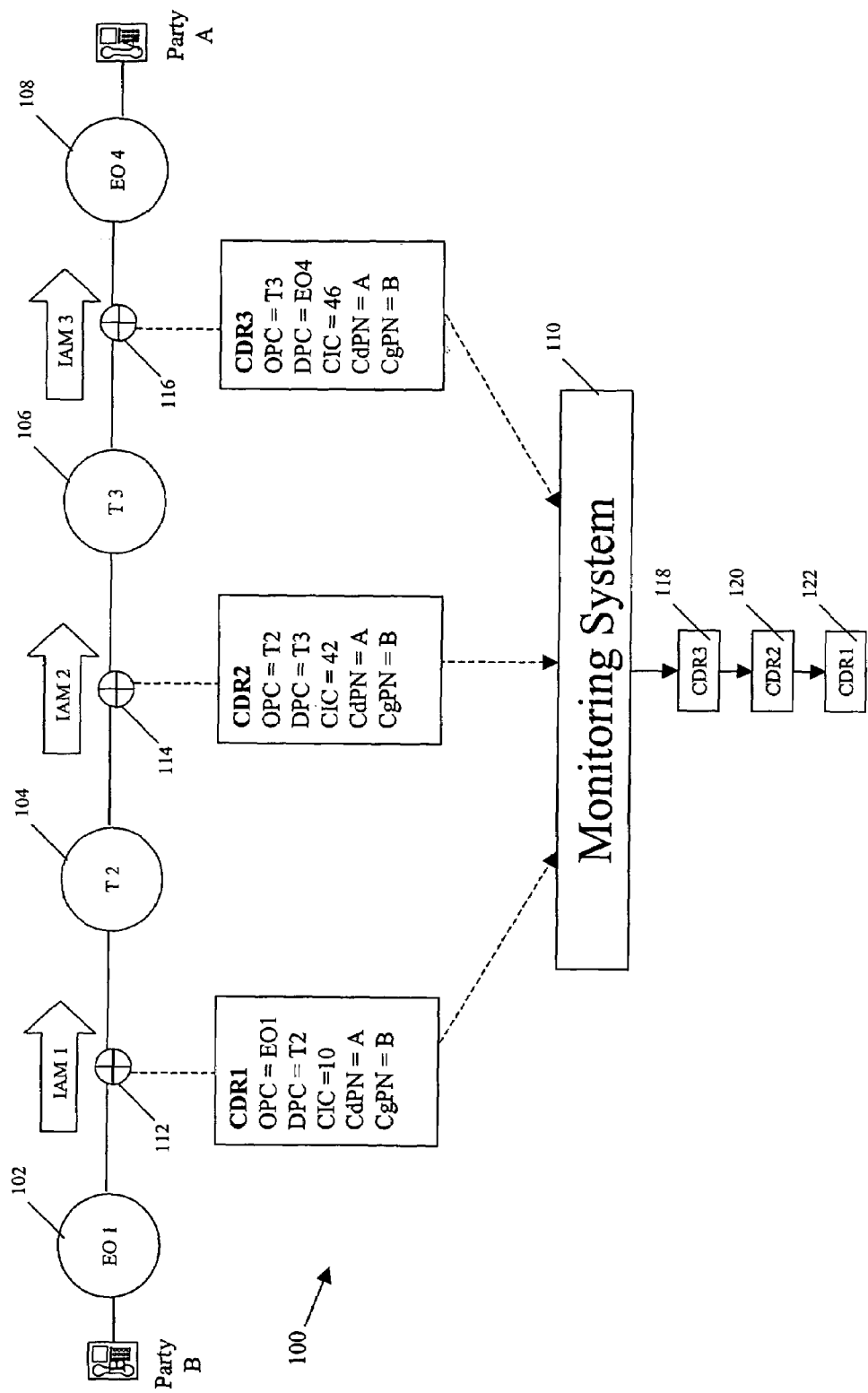
FIG. 1 is a network diagram illustrating a conventional network monitoring system that generates and reports multiple call detail records (CDRs) associated with a multi-leg call.

According to one aspect, the subject matter described herein includes methods, systems, and computer program products for selecting a single, representative CDR from a plurality of CDRs to a network services application (e.g., billing application, billing verification application, fraud application, presence service application, etc.) that requires a single CDR per call.

In one implementation, a single-CDR selection or generation algorithm associates an office type attribute each signaling system 7 (SS7) point code in a monitored network. Exemplary office type attribute values may include End Office (EO) and Tandem Office (TO), as illustrated in Table 1.

TABLE 1

Exemplary Office Type and Carrier ID Mapping

| Point Code | Office Type | Carrier ID |
|---|---|---|
| 1-1-1 | EO | Verizon |
| 2-2-2 | TO | Verizon |
| 3-3-3 | TO | Verizon |
| 4-4-4 | EO | Verizon |
| 5-5-5 | EO | Sprint |

In general, switching offices are assigned type attributes that correspond to their functions. For instance, in one implementation of the subject matter described herein, Class 5 offices may be assigned an office type attribute=EO, and Class 4 offices may be assigned an office type=TO. A switching office that provides both Class 5 and Class 4 services is referred to herein as a combined Class 4/5 tandem and may be assigned an office type=TO, as is the case for the sample scenarios presented herein. However, it will be appreciated that an office type="Combined Office" may be used to achieve the same results. In one embodiment of the subject matter described herein, point codes associated with interconnecting switching offices not belonging to the monitored network (e.g., an interconnecting tandem office owned by an interconnect carrier) may be assigned an office type attribute=EO, even if the interconnecting switching office is actually a tandem office (e.g., a Class 4 office). It will be appreciated that office type attributes according to the subject matter described herein may be assigned or applied to both circuit-switched offices (e.g., Class 5 end offices, Class 4 tandem offices, Class 4/5 offices, etc.) and packet-based nodes (e.g., media gateway, media gateway controller, softswitches, session initiation protocol servers, IP multimedia subsystem nodes, radio access network nodes, VoIP servers, etc.). As indicated in Table 1, a carrier identifier may also be associated with each switching office point code. Such carrier identification information may be used (e.g., incorporated within a CDR) in the event that signaling messages received from a foreign network (e.g., interconnect carrier network, other service provider network, etc.) do not include carrier identification information, such as SS7 ISDN user part (ISUP) transit network selection (TNS) or carrier identification parameter (CIP) information.

If the monitored network includes a combined local/tandem office (e.g., Class 4/5 office), the NPA-NXX identifiers associated with those subscribers that are served by the combined local/tandem office are included in a Tandem-NPA-NXX list. An exemplary Tandem-NPA-NXX list is illustrated below in Table 2.

TABLE 2

Exemplary Tandem-NPA-NXX List

| Point Code | NPA-NXX Range Start | NPA-NXX Range Stop |
| --- | --- | --- |
| 6-6-6 | 9193200000 | 9193209999 |
| 7-7-7 | 9194691000 | 9194691999 |
| 7-1-1 | 9194692000 | 9194692999 |
| 3-1-1 | 9194671000 | 9194691999 |

Figure 2:
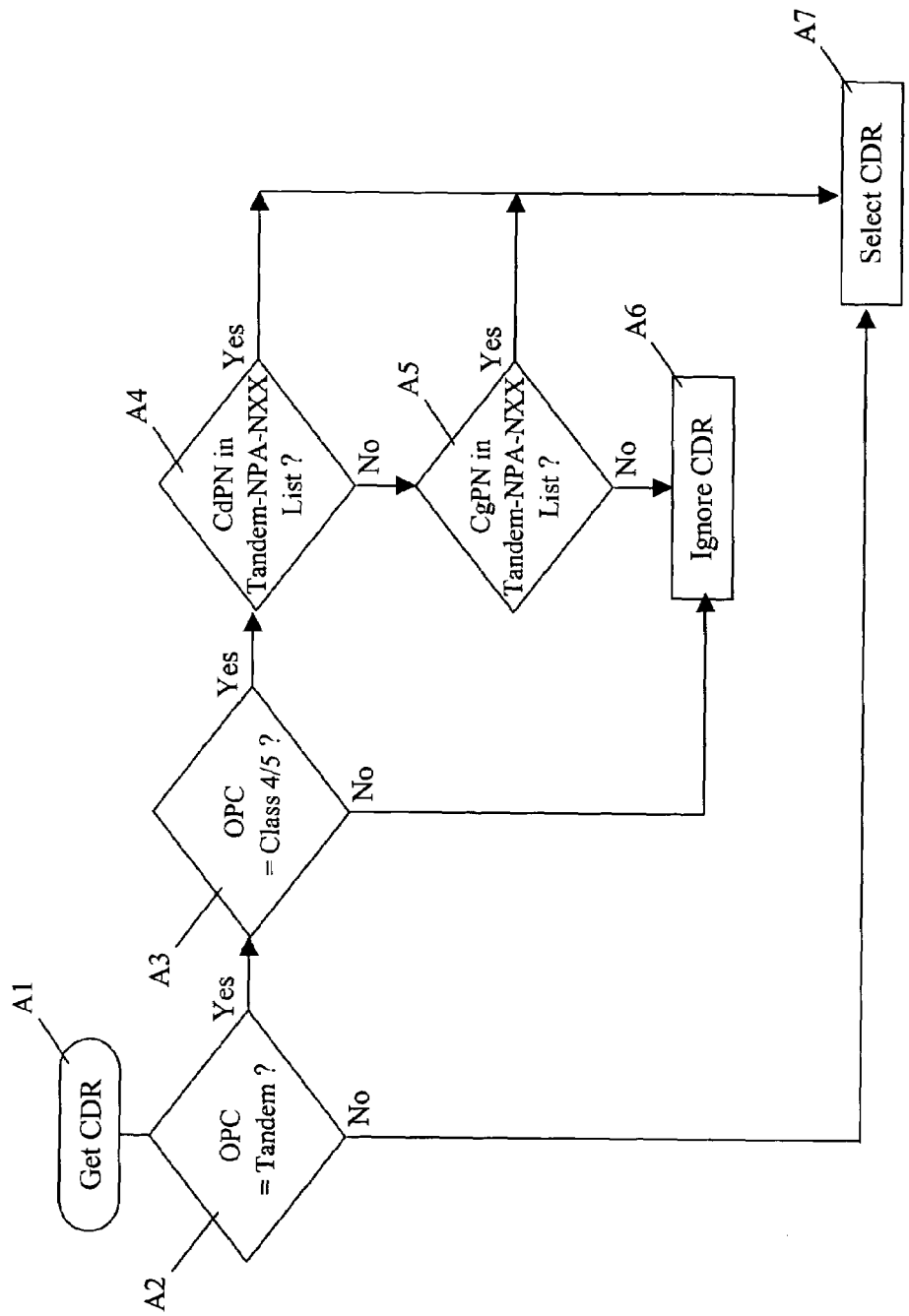
FIG. 2 is a flow chart illustrating an exemplary single-CDR selection algorithm according to an embodiment of the subject matter described herein.

FIG. 2 is a flow chart associated with an exemplary single-CDR selection method. The single-CDR selection method may be used to select a single CDR for a multi-CDR, multi-leg call from a database or buffer that contains CDR records collected from a number of sites in a communications network. The CDR records can be correlated (i.e., CDRs associated with the same call are grouped together) or uncorrelated. Communication networks from which the CDRs are collected may include wireline and mobile networks, which are either circuit-switched or packet-based, while CDR generation and collection may be accomplished via various probe-based or integrated probeless network monitoring system architectures, as will be described in detail below.

Beginning with step A1, a CDR entry is obtained from a CDR database or buffer that contains correlated or uncorrelated CDR records. An OPC parameter contained in the CDR is examined to obtain an origination point code value. A lookup is performed in a data structure similar to that presented above in Table 1, in order to determine the office type attribute associated with the OPC value (A2). If carrier identification information is missing from the CDR, then carrier ID information obtained from the lookup may be inserted into the CDR.

If it is determined that the office type of the OPC value is not equal to tandem office (TO), then the CDR is selected as a representative CDR, as indicated in step A7. A copy of the CDR may be generated and communicated to a network services application. If it is determined that the office type of the OPC value is equal to tandem office (TO), then a check is made to determine if the OPC is associated with a combined Class 4/5 switching office, as indicated in step A3. Information, such as that illustrated above in Table 2, may be used in making the Class 4/5 switching office determination. If it is determined that the OPC is not associated with a combined Class 4/5 office, then the CDR is ignored or excluded from further CDR selection processing, as indicated in step A6. If it is determined that the OPC is associated with a combined Class 4/5 office, then a called party number (CdPN) value is extracted from the CDR and used, along with the OPC value, to search an Tandem-NPA-NXX listing, such as that presented in Table 2 (A4). If a matching entry is located in the Tandem-NPA-NXX listing, then the CDR is selected as a representative CDR, as indicated in step A7. A copy of the CDR may be generated and communicated to a network services application. If a matching entry is not located in the Tandem-NPA-NXX listing, then a calling party number (CgPN) value is extracted from the CDR and used, along with the OPC value, to search the Tandem-NPA-NXX listing, as indicated in step A5. If a matching entry is located in the Tandem-NPA-NXX listing, then the CDR is selected as a representative CDR, as indicated in step A7. A copy of the CDR may be generated and communicated to a network services application. If a matching entry is not located in the Tandem-NPA-NXX listing, then the CDR is ignored, as indicated in step A6.

The single-CDR selection method described above may be repeated for each CDR in the CDR database or buffer, resulting in the selection of a single CDR associated with each call detected/recorded by a monitoring system. Copies of these selected, representative CDRs may be provided to network service applications that require a single CDR for each monitored call.

One advantage of the single CDR selection method illustrated in FIG. 2 is that it does not require that the CDRs being processed be correlated. Correlating CDRs can be processor intensive. The CDR selection steps illustrated in FIG. 2 can be executed on a database of uncorrelated CDRs. For calls that include multiple legs and consequently multiple CDRs, the CDR selection algorithm will select a single CDR. For single leg, single CDR calls, the single CDR will be selected. Thus, the result of executing the single CDR selection algorithm in FIG. 2 on a database that includes CDRs for multiple calls is a set of CDRs where one CDR is present for each call. Such a set or group of CDRs may useful for billing purposes, for example to reduce the likelihood of duplicate billing caused by multiple CDRs being present for the same call.

Even though the algorithm illustrated in FIG. 2 is capable of processing CDRs in a database of uncorrelated CDRs, the subject matter described herein is not limited to using the single CDR selection algorithm to process uncorrelated CDRs. The algorithm in FIG. 2 may be used on a database of correlated CDRs or a database that includes both correlated and uncorrelated CDRs without departing from the scope of the subject matter described herein.

Intra-Network Call Scenario

Figure 3:
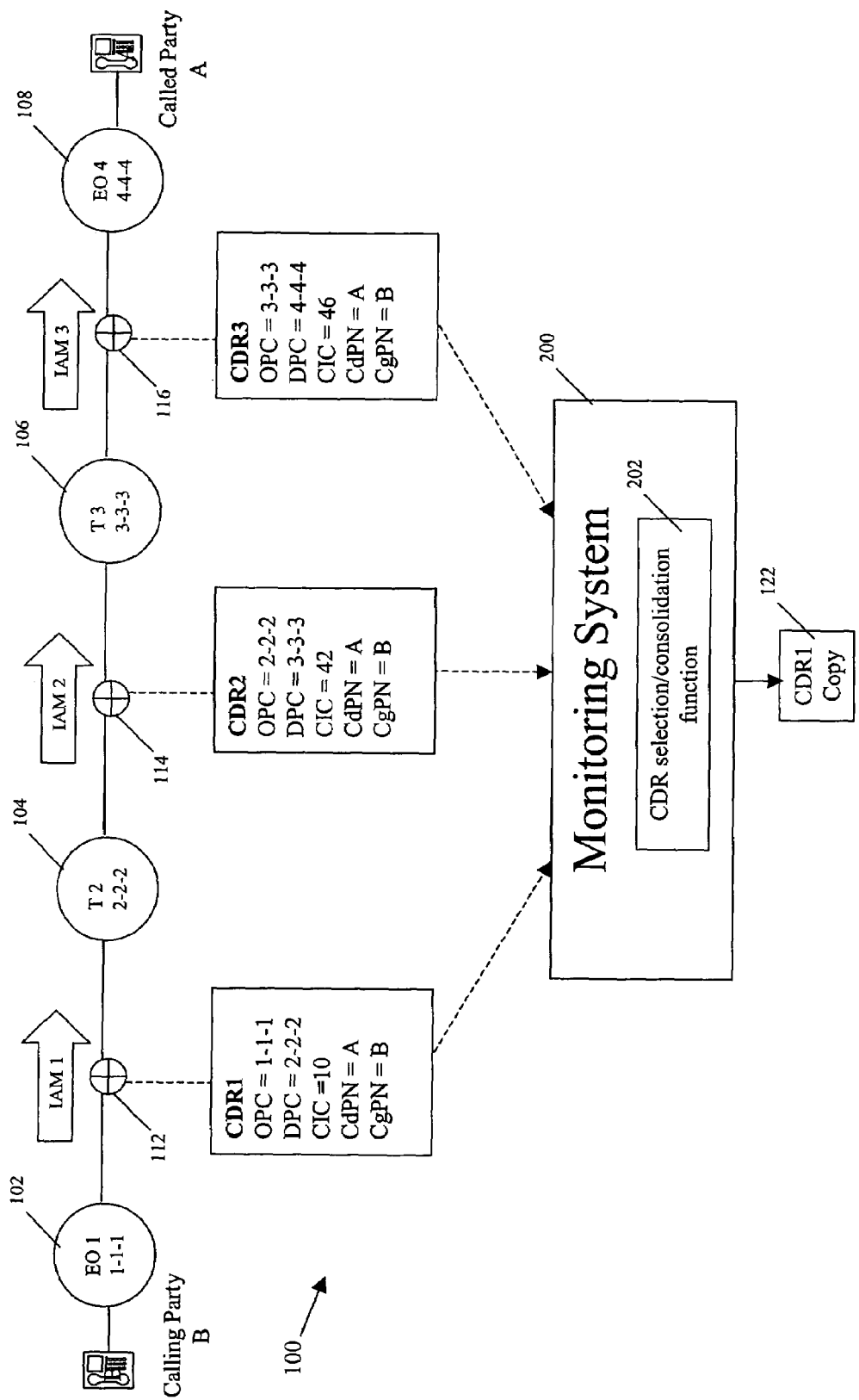
FIG. 3 is a network diagram illustrating an exemplary single-CDR selection scenario associated with a multi-leg, intra-network call according to an embodiment of the subject matter described herein.
Figure 4:
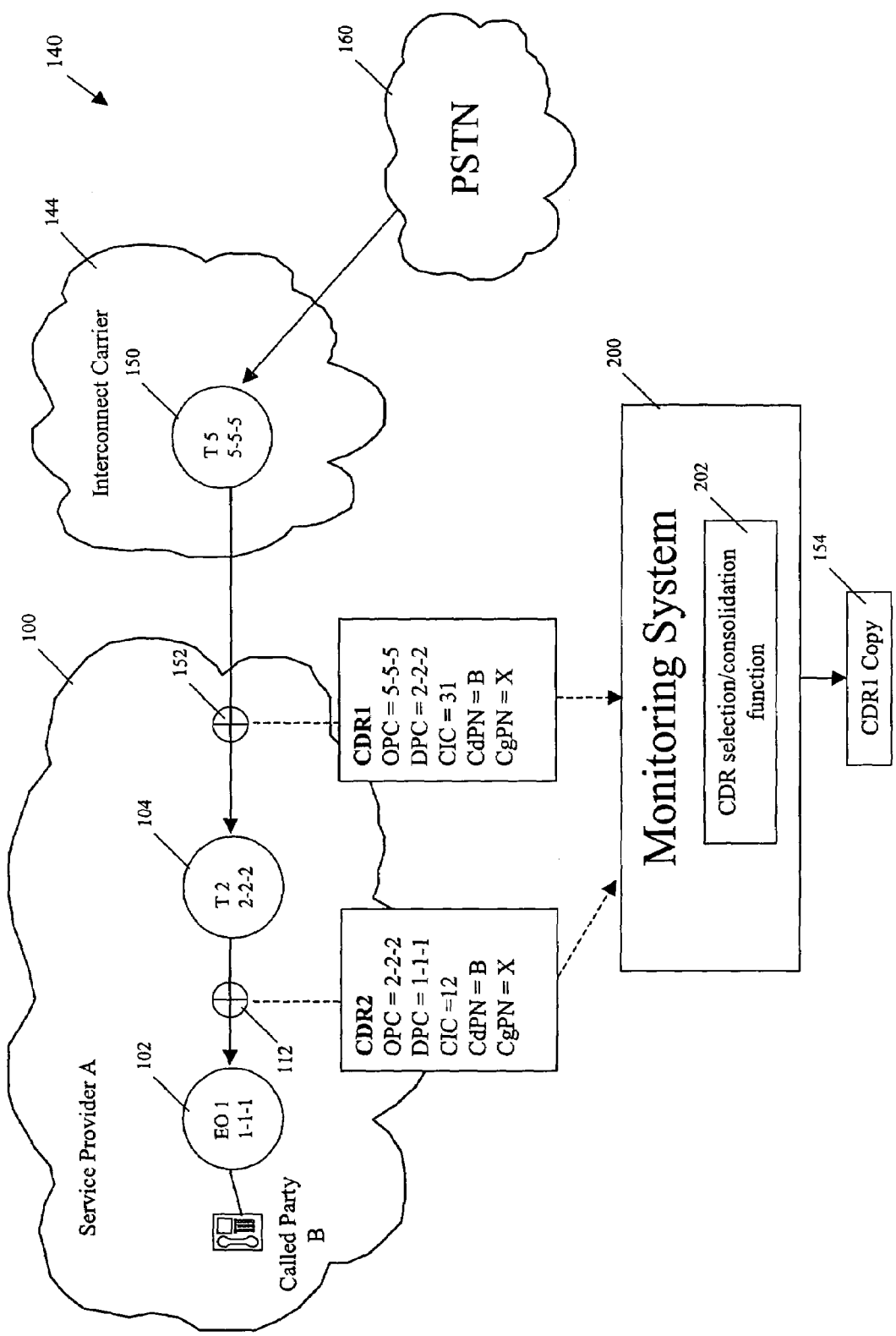
FIG. 4 is a network diagram illustrating an exemplary single-CDR selection scenario associated with an inbound multi-leg, inter-network call according to an embodiment of the subject matter described herein.
Figure 5:
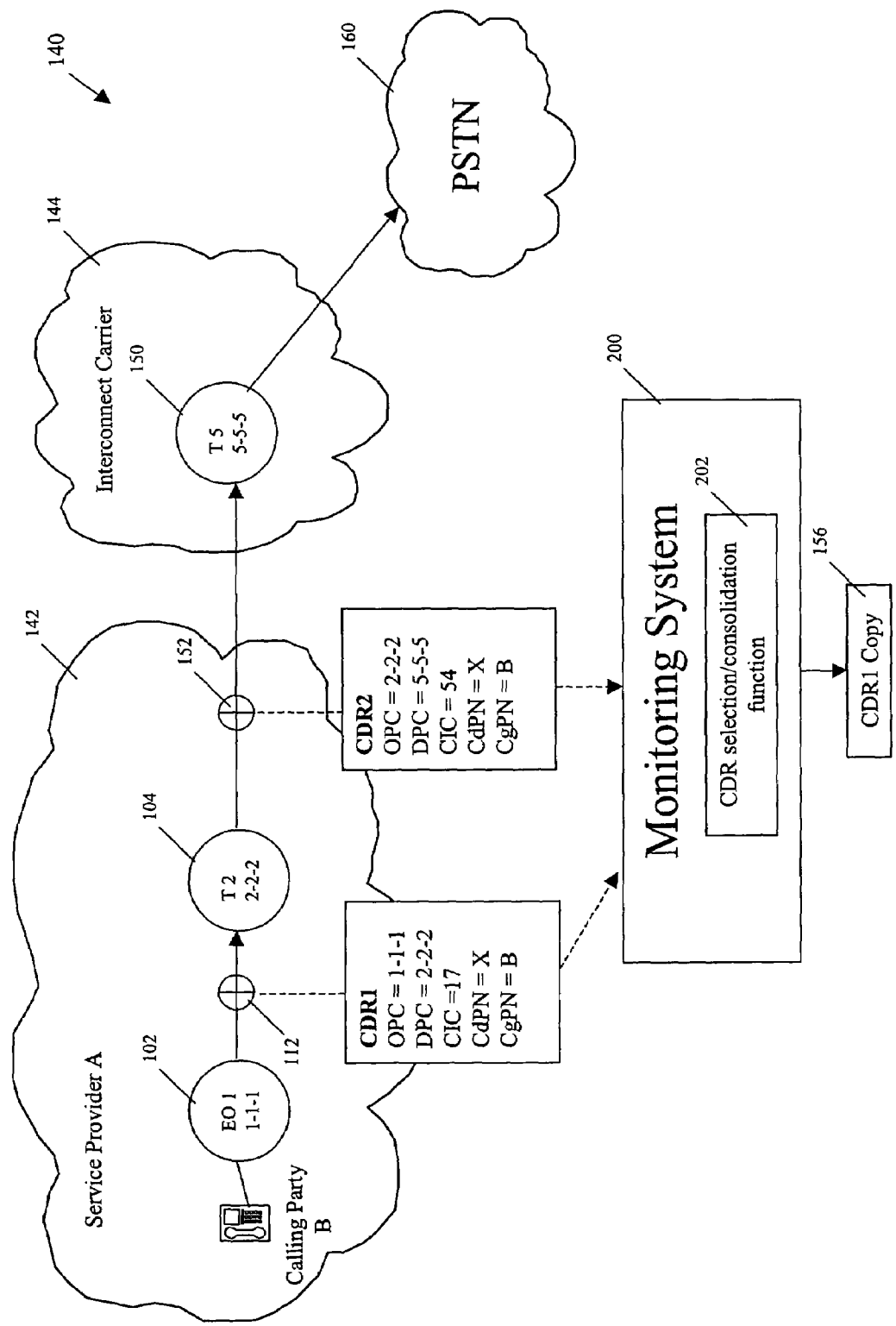
FIG. 5 is a network diagram illustrating an exemplary single-CDR selection scenario associated with an outbound multi-leg, inter-network call.

Exemplary single-CDR selection scenarios are illustrated in FIGS. 3, 4 and 5. FIG. 3 illustrates communications network 100 that includes a monitoring system 200 and associated CDR selection and consolidation function 202. As described above, network 100 includes a first end office (EO) 102 with a point code address 1-1-1, a first tandem office 104 with a point code address 2-2-2, a second tandem office 106 with a point code address 3-3-3, and a second EO 108 with a point code address 4-4-4. EO 102 serves calling party subscriber B, and EO 108 serves called party subscriber A. Monitoring system 200 may receive CDR information from several signaling link monitoring probes, 112, 114, and 116. More particularly, monitoring probe 112 may monitor and copy SS7 MSU traffic between EO 102 and tandem 104 and generate associated CDR information. Likewise, probe 114 may generate CDR information associated with monitored SS7 MSU traffic between tandem 104 and tandem 106, and monitoring probe 116 may generate CDR information associated with monitored SS7 MSU traffic between tandem 106 and EO 108. Monitoring system 200 receives and stores the CDR information from each remote monitoring probe. Selection and consolidation function 202 processes the stored CDR information using a CDR selection algorithm, such as the single-CDR selection algorithm described above with respect to FIG. 2. A set of CDRs with a single CDR being present for each call may then be provided to other applications that require one CDR per call (e.g., billing applications, fraud detection applications, presence service applications, etc.).

For the purposes of illustration, it is assumed that all switching offices in network 100 are owned and/or operated by the same service provider. In this example, the network service provider is Verizon, as indicated in Table 1. Furthermore, it is also assumed that none of the switching offices are combined Class 4/5 offices. Calling party B dials a telephone number associated with called party A, and, as a result, a sequence of three SS7 ISUP initial address messages (IAMs) is generated and communicated between the switching offices that comprise network 100, as indicated in FIG. 3. These IAM messages, IAM 1, IAM 2, and IAM 3 are detected by monitoring probes 112, 114, and 116, respectively. Those skilled in the art of telecommunication signaling will appreciate that additional ISUP signaling is required to complete a call setup operation; however, for purposes of illustration, only the IAM messages are depicted in FIG. 3.

In one exemplary implementation, each monitoring probe may generate a CDR record based on the observed IAM message and communicate the CDR information to monitoring system 200 via a communication link, such as an IP wide area network (WAN) connection. Accordingly, probe 112 may generate CDR1, probe 114 may generate CDR2, and probe 116 may generate CDR3. Monitoring system 200 may receive and store CDR1, CDR2, and CDR3. Selection consolidation function 202 may process some or all of the CDR records stored at monitoring system 200 using the single-CDR correlation method described above.

With regard to the contents of the three CDR records in this example, it will be appreciated that CDR1 includes the following parameters and associated values: OPC=1-1-1, DPC=2-2-2, CIC=10, CdPN=A, and CgPN=B. CDR2 includes the following parameters and associated values: OPC=2-2-2, DPC=3-3-3, CIC=42, CdPN=A, and CgPN=B. CDR3 includes the following parameters and associated values: OPC=3-3-3, DPC=4-4-4, CIC=46, CdPN=A, and CgPN=B. Based on the attribute assignment rules described above, end office 102 is assigned an office type attribute=EO, tandem office 104 is assigned an office type attribute=TO, tandem office 106 is assigned an office type attribute=TO, and end office 108 is assigned an office type attribute=EO, as indicated in Table 1.

Applying the single-CDR selection process illustrated in FIG. 2, if selection/consolidation function 202 initially selects CDR3 from the monitoring system CDR storage buffer (step A1), an examination of the OPC address contained in CDR3 reveals that the switching office associated with point code 3-3-3 has an office type attribute=TO (step A2). Given this result, a check is next performed to determine whether the switching office associated with point code 3-3-3 is a combined local/tandem office (step A3). Since tandem office 106 is not a combined local/tandem office, CDR3 is not selected as the representative CDR for the call (step A6). Selection/consolidation function 202 next selects CDR2 from the monitoring system CDR storage buffer (step A1) and repeats the remaining processing steps illustrated in FIG. 2. In this case, an examination of the OPC contained in CDR2 reveals that the switching office associated with point code 2-2-2 also has an office type attribute=TO (step A2), and a subsequent check is made to determine whether the switching office associated with point code 2-2-2 is a combined local/tandem office (step A3). Once again, since tandem office 104 is not a combined local/tandem office, CDR2 is not selected as the representative CDR for the call (step A6). Selection/consolidation function 202 next selects CDR1 from the monitoring system CDR storage buffer (step A1), and repeats the remaining processing steps illustrated in FIG. 2. In this case, an examination of the OPC contained in CDR1 reveals that the switching office associated with point code 1-1-1 has an office type attribute=EO (step A2), and as such CDR1 is selected as the representative CDR for the call (step A7). Since CDR1 is the chosen representative CDR for the call between calling party B and called party A, a copy of CDR1 is generated as CDR 122, and this copy is provided to network service applications that require a single CDR per call, as described above.

The subject matter described herein is not limited to any specific order for selecting and processing the three CDRs described above. That is, the three CDRs could have been selected from monitoring system storage in any order and processed with the same outcome (i.e., the selection of CDR1 as the representative CDR for the call). In addition, although the example described with respect to FIG. 3 included only CDRs for a single call, it is understood that the processing steps of FIG. 2 can be applied to a database or databases that store CDRs associated with a plurality of different calls.

Inter-Network Inbound Call Scenario

The scenario described above and illustrated in FIG. 3 is exemplary of single-CDR selection for an intra-network call. That is, FIG. 2 illustrates a call between two subscribers that reside within the same network or that are served by the same service provider. FIG. 4 illustrates a scenario that is exemplary of single-CDR correlation and consolidation processing associated with an inter-network call. That is, FIG. 4 illustrates a call between two subscribers that reside in different networks or that are served by the different service providers. More particularly, in FIG. 4, a call is received by a subscriber in a first monitored network, and the call is originated from a second, different network. Network environment 140 depicted in FIG. 4 includes network 100, which is operated by service provider A. As described above, network 100 includes a monitoring system 200 and associated CDR selection/consolidation function 202. For purposes of the present example, network 100 further includes an end office (EO) 102 with a point code of 1-1-1 and a tandem office 104 with a point code of 2-2-2.

Monitoring system 200 may receive CDR information from signaling link monitoring probes 112 and 152. More particularly, monitoring probe 112 may monitor SS7 MSU traffic between EO 102 and tandem 104 and generate associated CDR information. Likewise, probe 152 may generate CDR information associated with monitored SS7 MSU traffic between tandem 104 and an interconnect tandem 150 that is associated with an interconnect carrier network 144.

Interconnect tandem 150 is further connected to one or more nodes in another public switched telephone network (PSTN) 160, which in this example is where the calling party resides. Interconnect tandem office 150 is assigned a point code of 5-5-5. In this example, a call is placed by a calling party X from a network that is not operated by service provider A. The call from calling party X is placed to called party B, where called party B is served by service provider A. Consequently, a sequence of SS7 ISUP IAM messages is generated and communicated between the switching offices that comprise networks 100, 144 and 160. At least some of these IAM messages are detected by monitoring probes 112 and 152 in a manner similar to that described in the previous examples. Each monitoring probe may generate a CDR record based on the observed IAM message and communicate the CDR information to monitoring system 200 via a communication link, such as an IP wide area network (WAN) connection. Accordingly, probe 152 may generate CDR1 and probe 112 may generate CDR2. Monitoring system 200 may receive and store CDR1 and CDR2, while selection/consolidation function 202 may process some or all of the CDR records stored at monitoring system 200 using the single-CDR selection method described above.

With regard to the contents of the two CDR records in this example, it will be appreciated that CDR1 includes the following parameters and associated values: OPC=5-5-5, DPC=2-2-2, CIC=31, CdPN=B, and CgPN=X. CDR2 includes the following parameters and associated values: OPC=2-2-2, DPC=1-1-1, CIC=12, CdPN=B, and CgPN=X. Based on the attribute assignment rules described above, end office 102 is assigned an office type attribute=EO, tandem office 104 is assigned an office type attribute=TO, and interconnect tandem office 150 is assigned an office type attribute=EO, as indicated in Table 1.

Applying the single-CDR selection method illustrated in FIG. 2, if selection/consolidation function 202 initially selects CDR2 from the monitoring system CDR storage buffer (step A1), an examination of the OPC contained in CDR2 reveals that the switching office associated with point code 2-2-2 has an office type attribute=TO (step A2). Given this result, a check is next performed to determine whether the switching office associated with point code 2-2-2 is a combined local/tandem office (step A3). Since tandem office 104 is not a combined local/tandem office, CDR2 is not selected as the representative CDR for the call (step A6). Selection/consolidation function 202 next selects CDR1 from the monitoring system CDR storage buffer (step A1) and repeats the remaining steps illustrated in FIG. 2. In this case, an examination of the OPC contained in CDR1 reveals that the switching office associated with point code 5-5-5 has an office type attribute=EO (step A2), and as such CDR1 is selected as the representative CDR for the call (step A7). As the chosen representative CDR for the call between calling party X and called party B, a copy of CDR1 is generated as CDR 154, and this copy is provided to network service applications that require a single CDR per call, as described above. Again, it should be noted that the subject matter described herein is not limited to any specific order in processing the CDRs collected for the various legs of a call. The selected CDR will be the same regardless of the order in which the various CDRs are processed.

Based on the example above, it will be appreciated that for calls received into a monitored network, the subject matter described herein allows the interconnect carrier to be identified, via the carrier mapping information, such as that shown in Table 1, in the event that a CDR associated with the call does not contain sufficient interconnect carrier identification information. The single-CDR selection method achieves this objective by selecting the CDR associated with the interconnect carrier tandem as the representative CDR for the call, regardless of the total number of CDRs generated for the call.

Inter-Network Outbound Call Scenario

The scenario illustrated in FIG. 5 is exemplary of single-CDR selection processing associated with an inter-network outbound call. That is, in FIG. 5, a call is originated by a subscriber in a first monitored network, where the call is terminated in a second, non-monitored network. Network environment 140 described above is used once again to illustrate this scenario. In this case, subscriber B originates a call to subscriber X, thereby making subscriber B the calling party.

In this call setup scenario, probe 112 may generate CDR1 and probe 152 may generate CDR2. Monitoring system 200 may receive and store CDR1 and CDR2, while selection/consolidation function 202 may process some or all of the CDR records stored at monitoring system 200 using the single-CDR correlation method described above.

With regard to the contents of the two CDR records in this example, it will be appreciated that CDR1 includes the following parameters and associated values: OPC=1-1-1, DPC=2-2-2, CIC=17, CdPN=X, and CgPN=B. CDR2 includes the following parameters and associated values: OPC=2-2-2, DPC=5-5-5, CIC=54, CdPN=X, and CgPN=B. Once again, based on the attribute assignment rules described above, end office 102 is assigned an office type attribute=EO, tandem office 104 is assigned an office type attribute=TO, and interconnect tandem office 150 is assigned an office type attribute=EO, as indicated in Table 1.

Applying the single-CDR selection method illustrated in FIG. 2, if selection/consolidation function 202 initially selects CDR2 from the monitoring system CDR storage buffer (step A1), an examination of the OPC contained in CDR2 reveals that the switching office associated with point code 2-2-2 has an office type attribute=TO (step A2). Given this result, a check is next performed to determine whether the switching office associated with point code 2-2-2 is a combined local/tandem office (step A3). Since tandem office 104 is not a combined local/tandem office, CDR2 is not selected as the representative CDR for the call (step A6). Selection/consolidation function 202 next selects CDR1 from the monitoring system CDR storage buffer (step A1) and repeats the remaining steps illustrated in FIG. 2. In this case, an examination of the OPC contained in CDR1 reveals that the switching office associated with point code 1-1-1 has an office type attribute=EO (step A2), and as such CDR1 is selected as the representative CDR for the call (step A7). As the chosen representative CDR for the call between calling party B and called party X, a copy of CDR1 is generated as CDR 156, and this copy is provided to network service applications that require a single CDR per call, as described above. Again, it will be appreciated that the subject matter described herein is not limited to any particular order in processing the CDRs.

Based on the example above, it will be appreciated that for calls leaving a monitored network, the subject matter described herein is adapted to allow the interconnect carrier to be identified. The single-CDR selection algorithm achieves this objective by selecting the CDR associated with the originating end office as the representative CDR for the call, regardless of the total number of CDRs generated for the call. Since this CDR is typically generated by the same network operator that is monitoring the network, this CDR will generally contain information (e.g., a TNS parameter, a CIP parameter, etc.) which identifies the interconnect carrier that has been chosen to transport the call.

Multiple CDR Consolidation Algorithm

According to another aspect, the subject matter described herein includes a method for processing a plurality of CDRs associated with a multi-leg call and producing a consolidated or "blended" CDR that is representative of the call and includes information obtained from some or all of the multiple CDRs. Correlated CDR records associated with a multi-leg call may be tagged or linked to the same call, thereby effectively providing a link-consolidated CDR. In any event, the consolidated CDR is made available to network applications including billing, billing verification, and fraud detection applications that require a consolidated CDR per call.

In one embodiment, a CDR consolidation algorithm associates an office type attribute with each SS7 point code in a monitored network. Exemplary office type attribute values may include End Office (EO) and Tandem Office (TO), as illustrated in Table 1. If the monitored network includes a combined local/tandem office (e.g., Class 4/5 office), the NPA-NXX identifiers associated with those subscribers that are served by the combined local/tandem office are included in a Tandem-NPA-NXX list, such as the list illustrated above in Table 2.

Figure 6:
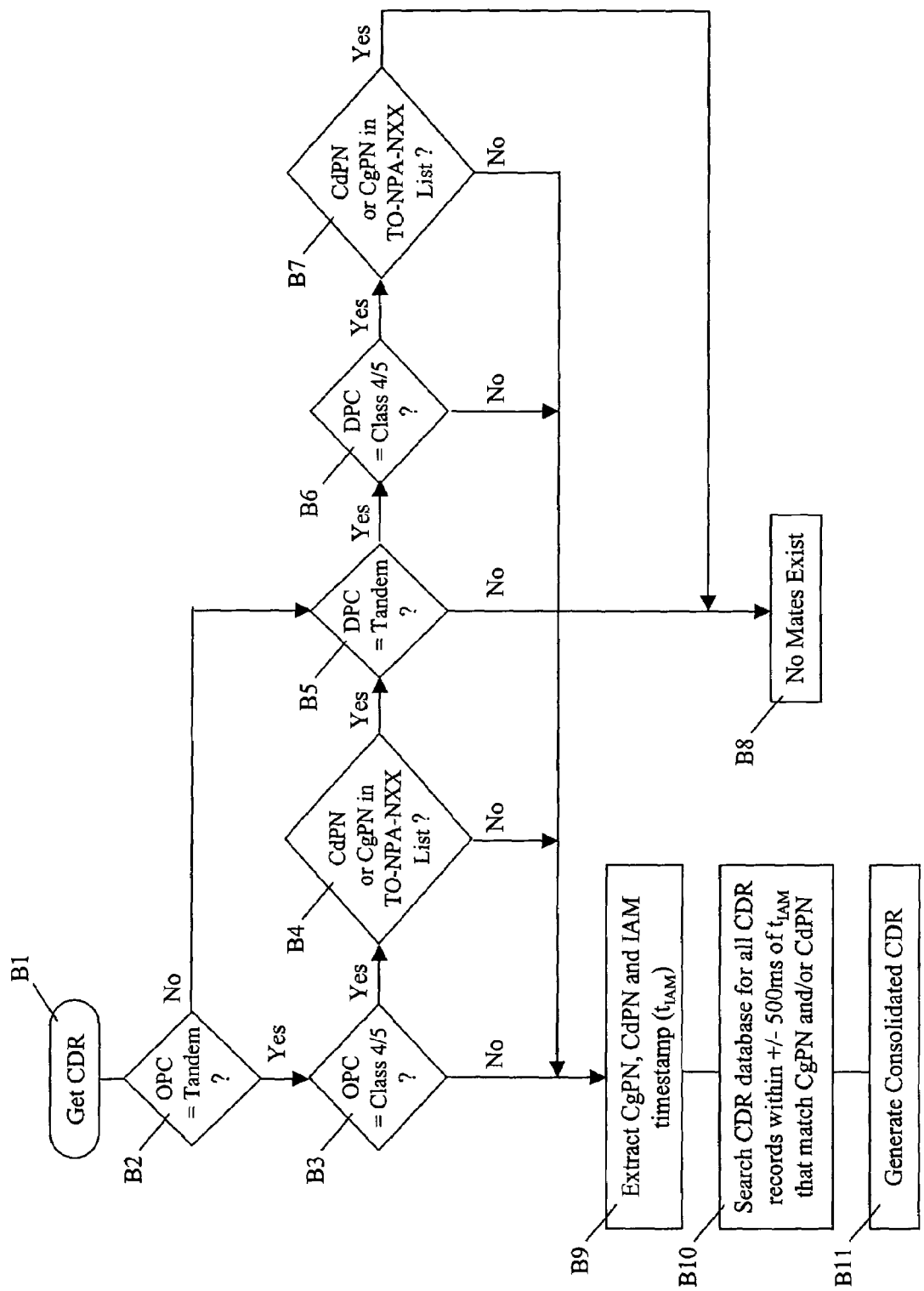
FIG. 6 is a flow chart illustrating an exemplary consolidated CDR generation algorithm according to an embodiment of the subject matter described herein.

FIG. 6 is a flow chart associated with an exemplary CDR consolidation algorithm. The CDR consolidation algorithm may be used to perform correlation processing operations on a database or buffer that contains CDR records collected from a number of sites in a communications network. Communication networks may include wireline and mobile networks, which are either circuit-switched or packet-based, while CDR generation and collection may be accomplished via various probe-based or integrated probeless network monitoring system architectures, which will be described in detail below.

Beginning with step B1, a CDR entry is obtained from a CDR database or buffer that contains many uncorrelated CDR records. An OPC parameter contained in the CDR is examined to obtain an origination point code value. A lookup is performed in a data structure similar to that presented above in Table 1 in order to determine the office type attribute associated with the OPC value (B2). If carrier identification information is missing from the CDR, then carrier ID information obtained from the lookup may be inserted into the CDR.

If it is determined that the office type of the OPC value is not equal to tandem office (TO), then a subsequent check is performed to determine whether the office type associated with the DPC value is equal to TO, as indicated in step B5. If it is determined that the office type of the DPC value is not equal to TO, then the call associated with the CDR is not a multi-leg call, and no further correlation processing is required (B8). If it is determined that the office type of the DPC value is equal to TO, then a check is performed to determine if the DPC is associated with a combined Class 4/5 switching office, as indicated in step B6. If the DPC is not associated with a combined Class 4/5 switching office, then called party number (CdPN), calling party number (CgPN), and ISUP IAM timestamp ($t_{IAM}$) values are extracted from the CDR (B9). The CDR database is then searched for all records with matching CgPN and CdPN values, as indicated in step B10.

In one implementation, the search may be limited to those CDR records in the database that include a IAM timestamp value that is within a predetermined time window relative to $t_{IAM}$. An exemplary time window is ±400 milliseconds from $t_{IAM}$. This time window may be set by a network operator depending, for instance, on average switch delay times and IN/AIN query processing times (e.g., number portability query processing times) in the network. Those CDRs that are located in the B10 search may then be consolidated into a single "blended" or "super" CDR, or the individual matching CDR records may be tagged or linked with a correlation identifier value (B11). In the latter case, the correlation identifier value may be included in an existing CDR record data field (e.g., post- or pre-pended to data in an existing CDR data field). Alternatively, a new-field may be added to each of the matching CDR records, and the correlation identifier value may be stored in this new field. The particular CDR consolidation format may be customized by a network operator to satisfy the data input requirements of various network service applications.

If, in step B6, it is determined that the DPC is associated with a combined Class 4/5 switching office, then called party number (CdPN) and calling party number (CgPN) values are extracted from the CDR and used, along with the OPC value, to search an Tandem-NPA-NXX listing, such as that presented in Table 2 (B7). If a matching entry is located in the Tandem-NPA-NXX listing for either the CdPN or CgPN, then the call associated with the CDR is not a multi-leg call, and no further correlation processing is required (B8). If a matching entry is not located in the Tandem-NPA-NXX listing, then steps B9–B11 are repeated, as described above.

Returning to step B2, If it is determined that the office type of the OPC value is equal to tandem office (TO), then a subsequent check is performed to determine if the OPC is associated with a combined Class 4/5 switching office, as indicated in step B3. Information such as that presented above in Table 2 may be used in making the Class 4/5 switching office determination. If it is determined that the OPC is associated with a combined Class 4/5 office, then called party number (CdPN) and calling party number (CgPN) values are extracted from the CDR and used, along with the OPC value, to search an Tandem-NPA-NXX listing, such as that presented in Table 2 (B4). If a matching entry is located in the Tandem-NPA-NXX listing for either the CdPN or CgPN, then processing branches to step B5 (and subsequent steps), as described above. If a matching entry is not located in the Tandem-NPA-NXX listing, then steps B9–B11 are repeated, as described above. Returning to step B3, if it is determined that the OPC is not associated with a combined Class 4/5 switching office, then steps B9–B11 are repeated.

The consolidated CDR generation method described above may be repeated for each uncorrelated CDR in the CDR database or buffer, thereby resulting in the generation of a single consolidated CDR associated with each call detected/recorded by a monitoring system or a chain of link-consolidated CDR records associated with each call detected/recorded by a monitoring system. Copies of these consolidated CDRs may be provided to network service applications that require a single consolidated CDR record or chain of link-consolidated CDR records for each monitored multi-leg call.

Exemplary Consolidated CDR Generation Scenario

Figure 7:
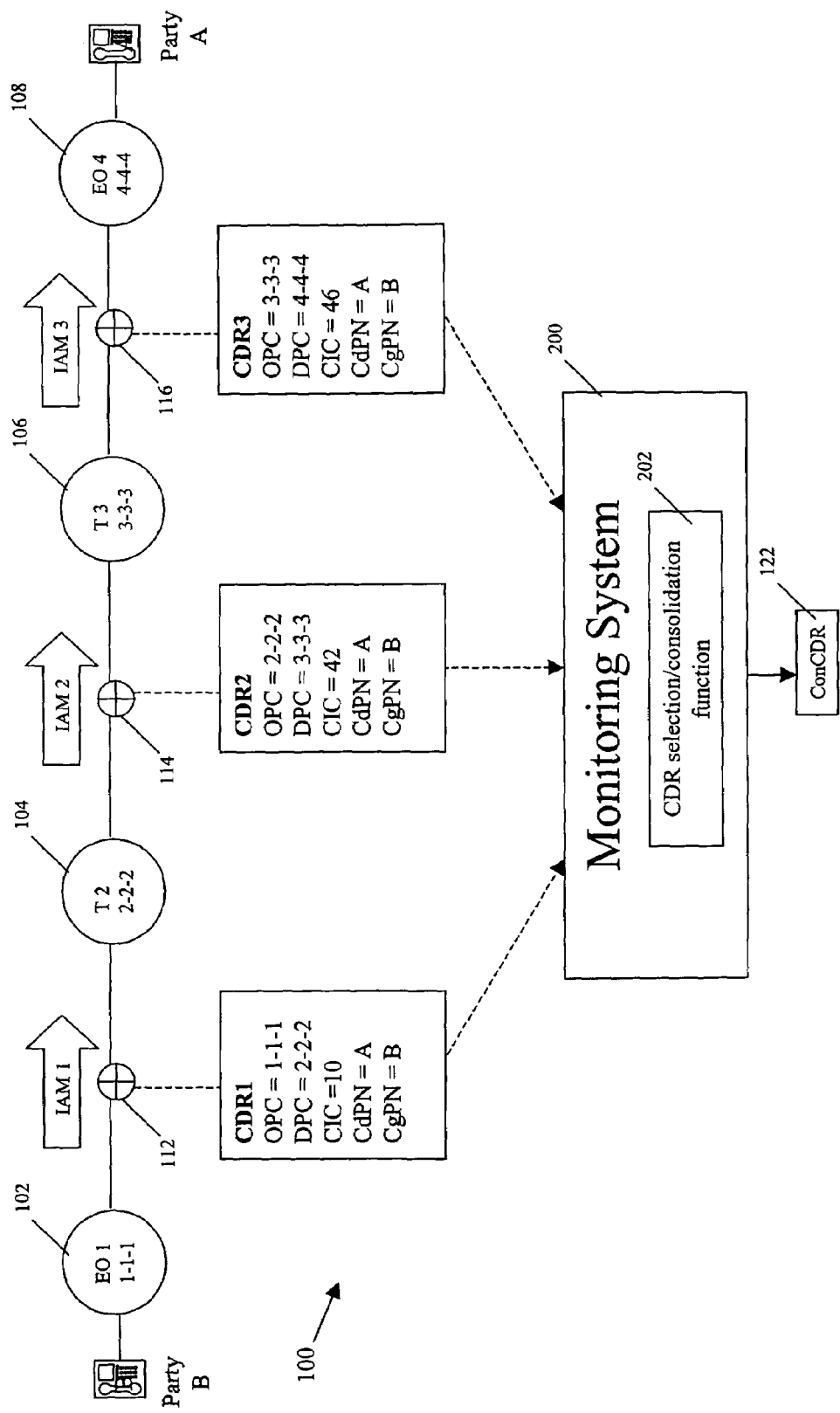
FIG. 7 is a network diagram illustrating an exemplary blended or consolidated CDR generation scenario associated with a multi-leg call according to an embodiment of the subject matter described herein.

FIG. 7 is communications network 100 that includes a monitoring system 200 and associated CDR correlation and consolidation function 202. As described above, network 100 includes a first end office (EO) 102 with a point code 1-1-1, a first tandem office 104 with a point code 2-2-2, a second tandem office 106 with a point code 3-3-3, and a second EO 108 with a point code 4-4-4. EO 102 serves a calling party subscriber B, while EO 108 serves called party subscriber A. Monitoring system 200 may receive CDR information from several signaling link monitoring probes, 112, 114, and 116. More particularly, monitoring probe 112 may monitor SS7 MSU traffic between EO 102 and tandem 104 and generate associated CDR information. Likewise, probe 114 may generate CDR information associated with monitored SS7 MSU traffic between tandem 104 and tandem 106, and monitoring probe 116 may generate CDR information associated with monitored SS7 MSU traffic between tandem 106 and EO 108. Monitoring system 200 receives and stores the CDR information from each remote monitoring probe. Selection/consolidation function 202 processes the stored CDR information using a CDR consolidation algorithm, such as the CDR consolidation algorithm illustrated in FIG. 6. Consolidated CDR information is then provided to other applications that require a single consolidated CDR per multi-leg call, or a linked chain of CDR records per multi-leg-call.

For purposes of illustration, it is assumed that all switching offices in network 100 are owned and/or operated by the same service provider. In this example, the network service provider is Verizon, as indicated in Table 1. Furthermore, it is also assumed that none of the switching offices are combined Class 4/5 offices. Calling party B dials a telephone number associated with called party A, and, as a result, a sequence of three SS7 ISUP initial address messages (IAMs) is generated and communicated between the switching offices of network 100, as indicated in FIG. 7. These IAM messages, IAM 1, IAM 2, and IAM 3 are detected by monitoring probes 112, 114, and 116, respectively. In one implementation, each monitoring probe may generate a CDR record based on the observed IAM message and communicate the CDR information to monitoring system 200 via a communication link, such as an IP wide area network (WAN) connection. Accordingly, probe 112 may generate CDR1, probe 114 may generate CDR2, and probe 116 may generate CDR3. Monitoring system 200 may receive and store CDR1, CDR2, and CDR3. Selection/consolidation function 202 may process some or all of the CDR records stored at monitoring system 200 using the consolidated CDR generation method illustrated in FIG. 6.

With regard to the contents of the three CDR records in this example, it will be appreciated that CDR1 includes the following parameters and associated values: OPC=1-1-1, DPC=2-2-2, CIC=10, CdPN=A, and CgPN=B. CDR2 includes the following parameters and associated values: OPC=2-2-2, DPC=3-3-3, CIC=42, CdPN=A, and CgPN=B. CDR3 includes the following parameters and associated values: OPC=3-3-3, DPC=4-4-4, CIC=46, CdPN=A, and CgPN=B. Based on the attribute assignment rules described above, end office 102 is assigned an office type attribute=EO, tandem office 104 is assigned an office type attribute=TO, tandem office 106 is assigned an office type attribute=TO, and end office 108 is assigned an office type attribute=EO, as indicated in Table 1.

Applying the consolidated CDR generation method illustrated in FIG. 6, if selection/consolidation function 202 initially selects CDR3 from the monitoring system CDR storage buffer (step B1), an examination of the OPC contained in CDR3 reveals that the switching office associated with point code 3-3-3 has an office type attribute=TO (step B2). Given this result, a check is next performed to determine whether the switching office associated with point code 3-3-3 is a combined local/tandem office (step B3). Since tandem office 106 is not a combined local/tandem office, the CdPN value A, the CgPN value B, and a timestamp value associated with the IAM 3 are extracted from CDR3 (step B9). The CDR database is searched for all CDRs that contain matching CdPN and CgPN values within ±400 milliseconds of the extracted timestamp value. In this case, CDR1 and CDR2 would be located since they would be within the 800-millisecond search window, and since they have matching CdPN and CgPN values.

As described above, a super CDR may be created which contains some or all of the information carried in the three individual CDR records. An example consolidated CDR that combines CDR1, CDR2 and CDR3 from the preceding example is presented below in Table 3. It will be appreciated that the parameters presented in Table 3 are merely illustrative of the type of signaling message/CDR information that may be included in a consolidated CDR record.

TABLE 3

Exemplary Consolidated CDR Format

| Parameter | Value |
|---|---|
| OPC 1 | 1-1-1 |
| DPC 1 | 2-2-2 |
| CIC 1 | 10 |
| CdPN 1 | A |
| CgPN 1 | B |
| Timestamp | $T_1$ |
| OPC 2 | 2-2-2 |
| DPC 2 | 3-3-3 |
| CIC 2 | 42 |
| CdPN 2 | A |
| CgPN 2 | B |
| Timestamp | $T_2$ |
| OPC 3 | 3-3-3 |
| DPC 3 | 4-4-4 |
| CIC 3 | 46 |
| CdPN 3 | A |
| CgPN 3 | B |
| Timestamp | $T_3$ |

Alternatively, the three CDR records may be modified to include a tag identifier, which effectively links or associates the CDR records with the same multi-leg call. In yet another embodiment, selection/consolidation function 202 may generate a linking message, which identifies the three CDR records as being related to the same multi-leg call. The linking message, along with copies of the three CDR records, may be provided to network service applications.

Number Portability Considerations

Within communication network environments that support number portability (NP), adjustments to the single-CDR selection method and the consolidated CDR generation method described above may be required to provide optimal correlation results. For example, in a wireline network that supports number portability, each switching office is assigned at least one location routing number (LRN). LRN values are typically formatted in a manner similar to NPA-NXX subscriber identifiers (e.g., LRN=919 460 0000). When a called party telephone number is dialed, the originating switch determines whether the called party NPA-NXX is associated with an exchange that is known to contain ported subscribers. If the called party NPA-NXX is determined to be associated with a ported exchange, then the originating switch formulates a number portability query that is sent to a number portability database. If the called party NPA-NXX has been ported, the number portability database returns the LRN value associated with the terminating switching office that is currently serving the ported subscriber. The originating switch then generates an ISUP IAM message. The originally dialed called party telephone number is placed in a generic address parameter (GAP) and the terminating switch LRN value is placed in the CdPN field of the IAM message. A translated called number parameter in a forward call indicator (FCI) field of the IAM message is set, so as to indicate to other switches/nodes in the network that NP translation processing has been performed.

In some cases, the originating switching office may not perform or initiate an NP translation, and instead, an intermediate switching office (e.g., tandem office) may perform the NP translation. In such cases, all ISUP IAM messages associated with a multi-leg call may not contain the same value in the CdPN field of the message. As stated above, the original CdPN value is placed in the GAP parameter, and an LRN associated with the terminating switching office is placed in the CdPN field following NP translation.

Figure 8:
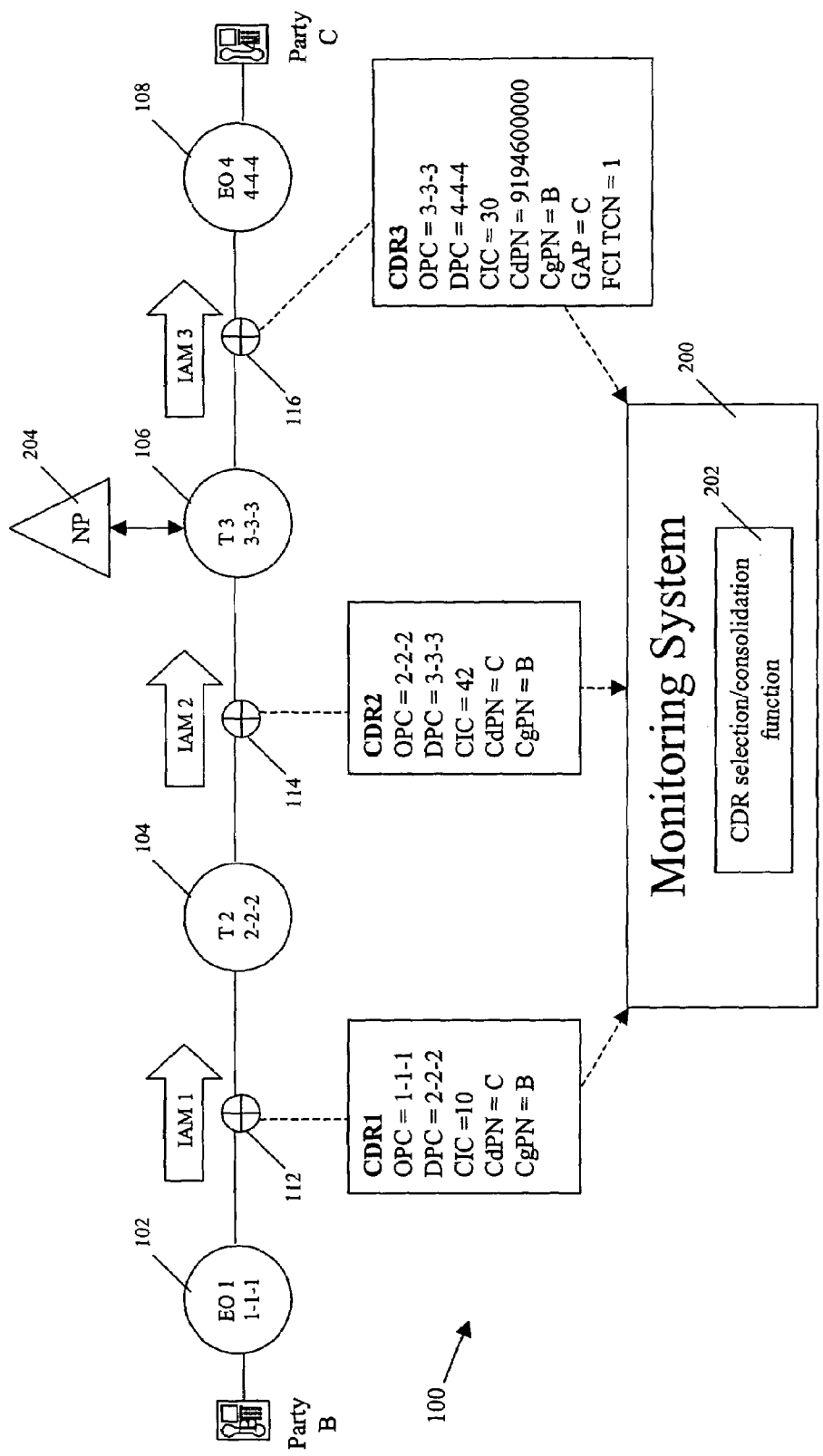
FIG. 8 is a network diagram illustrating an exemplary blended or consolidated CDR generation scenario associated with a multi-leg call that involves number portability translation processing according to an embodiment of the subject matter described herein.

An exemplary multi-leg call scenario that includes a number portability translation is illustrated in FIG. 8. In FIG. 8, network 100 includes several switching offices, including tandem office 106. In this example, tandem office 106 performs number portability translation processing during a multi-leg call setup between a calling party subscriber A and a called party subscriber C. Called party subscriber C has been ported to switching end office 108 from another office. For the purposes of this example, switching office 108 has been assigned a location routing number (LRN) value of 9194600000.

As such, IAM messages IAM 1 and IAM 2 are generated and communicated through the network as described above. However, after receiving IAM 2, tandem office 106 queries an NP service control point (SCP) or database 204, and, in response, receives the LRN value 9194600000, which is the routing number associated with "ported-to" or terminating end office 108. Using the NP translation information, tandem office generates IAM 3, which includes a CdPN value of 9194600000, a GAP value with the originally dialed called party C telephone number, and an FCI translated called number indicator value of 1 (which indicates that NP translation has been performed).

As described above, monitoring system 200 may detect the three IAM messages via monitoring probes 112, 114 and 116. CDR records CDR1, CDR2 and CDR3 are subsequently generated by monitoring system 200, based on the detected IAM messages. As illustrated in FIG. 8, CDR3 includes a CdPN value of 9194600000, a GAP value with the originally dialed called party C telephone number, and an FCI translated called number indicator value of 1. The other CDR records associated with the multi-leg call, CDR1 and CDR2, include a CdPN value that is equal to the originally dialed called party C telephone number. No GAP parameters and no FCI translated called number indicator (or an FCI translated called number value of 0) are contained in CDR1 and CDR2.

To accommodate these NP-translation-induced differences, the following NP enhancements may be made to the above-described consolidated CDR generation algorithm, which is generally illustrated in FIG. 6. Steps B4 and B7 of the flow chart illustrated in FIG. 6 may be modified to accommodate NP translation. In one approach, all LRN values associated with a combined Class 4/5 switching office are included in that office's Tandem-NPA-NXX listing. In other words, all LRN values associated with a combined Class 4/5 switching office may be treated the same as if they were NPA-NXX identifiers associated subscribers serviced by that office.

Alternatively, if LRN values are not included in the Tandem-NPA-NXX listing, a check may be performed to determine if the CDR record being processed includes an FCI translated called number indicator value of 1 (which indicates that NP translation has been performed) or if a GAP parameter is present in the CDR. If the CDR record does not include an FCI translated called number indicator value of 1, or there is not a GAP parameter present in the CDR, then the Tandem-NPA-NXX listing may be searched using the CdPN value. If, however, the CDR record does include an FCI translated called number indicator value of 1 or a GAP parameter is determined to be present in the CDR, then the Tandem-NPA-NXX listing may be searched using the GAP value.

With regard to steps B9 and B10, additional logic or processing steps may be added to check the CDR record that is being processed for the presence of NP translation information. For example, a check may be performed to determine if the CDR record being processed includes an FCI translated called number indicator value of 1 (which indicates that NP translation has been performed) or if a GAP parameter is present in the CDR. If the CDR record does not include an FCI translated called number indicator value of 1 or there is not a GAP parameter present in the CDR, then the CDR database may be searched for all CDR records within ±500 milliseconds of the $t_{IAM}$ that include matching CgPN and/or CdPN values, where a matching CdPN value may include a searched CDR record GAP parameter value that matches the CdPN search value.

If the CDR record includes an FCI translated called number indicator value of 1 or there is a GAP parameter present in the CDR, then the CDR database may be searched for all CDR records within ±500 milliseconds of the $t_{IAM}$ that include matching CgPN and/or GAP values, where a matching GAP value may include a searched CDR record CdPN parameter value that matches the GAP search value.

In a network environment that employs number portability services, such as that described above, it will be appreciated that a consolidated CDR produced by the present invention may contain GAP and jurisdiction information parameter (JIP) that otherwise would not be present in each individual CDR associated with a multi-leg call.

Figure 9:
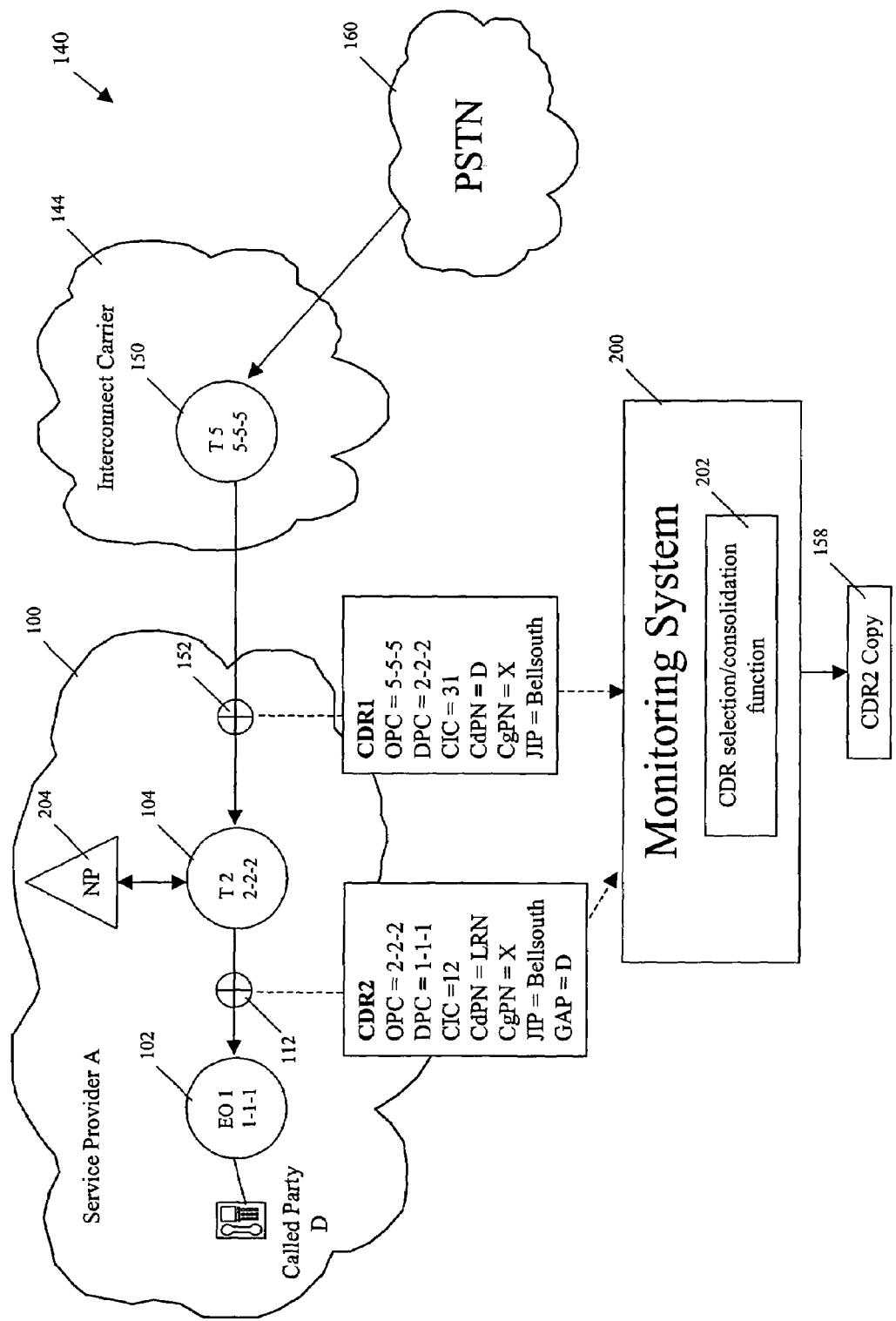
FIG. 9 is a network diagram illustrating an exemplary single-CDR generation scenario associated with a multi-leg call that involves number portability translation processing according to an embodiment of the subject matter described herein.

In yet another embodiment of the subject matter described herein, using the number portability processing modifications similar to those described above, a number portability enhanced single-CDR selection algorithm includes selecting one of many CDR records associated with a multi-leg call in a number portability environment. In cases where a single CDR must be selected to be representative of a multi-leg call, it may be advantageous to select a CDR that contains number portability translation information relevant to the multi-leg call. For example, as illustrated in FIG. 9, when NP translation processing has been preformed during the course of a multi-leg call setup, it may be desirable to select the one-of-many CDR records associated with the call that includes GAP and JIP information. As such, correlation processing similar to that described above with respect to the NP-enhanced consolidated CDR generation may be performed to locate all individual CDR records associated with a multi-leg call. However, instead of consolidating the individual CDR records into a single super CDR or tagging/linking the multiple CDRs, a single CDR may be selected from the correlated group of CDR records associated with the multi-leg call, where the single CDR record contains GAP and/or JIP parameter information. In the example illustrated in FIG. 9, tandem office 104 performs NP translation and inserts LRN and GAP information in an IAM message that is sent between tandem 104 and terminating end office 102. Monitoring system 200 generates CDR1 and CDR2, as illustrated in FIG. 9, where CDR2 includes LRN and GAP information associated with the NP translation.

According to the NP-enhanced single-CDR selection method described above, selection/consolidation function 202 may examine the two CDR records that were identified via the NP enhanced correlation algorithm described above and select CDR2 as the representative CDR for the multi-leg call, since CDR2 contains LRN, GAP, and JIP information. A copy of CDR2 is generated as CDR 158, and this copy is provided to network service applications that require a single CDR per call, as described above.

Exemplary Monitoring System Architectures

Figure 10:
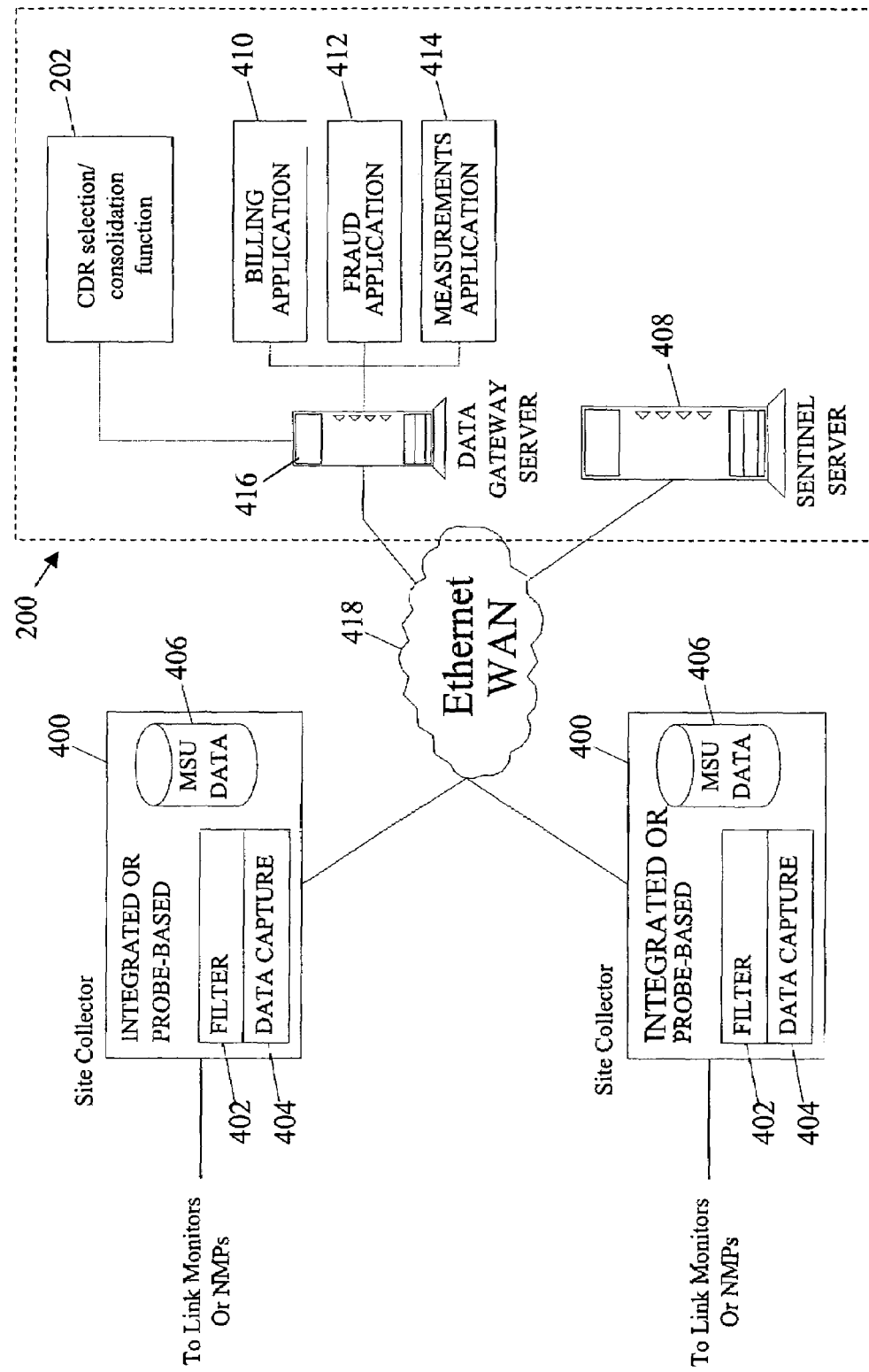
FIG. 10 is a network diagram illustrating an exemplary system architecture for a monitoring system that includes CDR selection and consolidation functionality according to an embodiment of the subject matter described herein.
Figure 11:
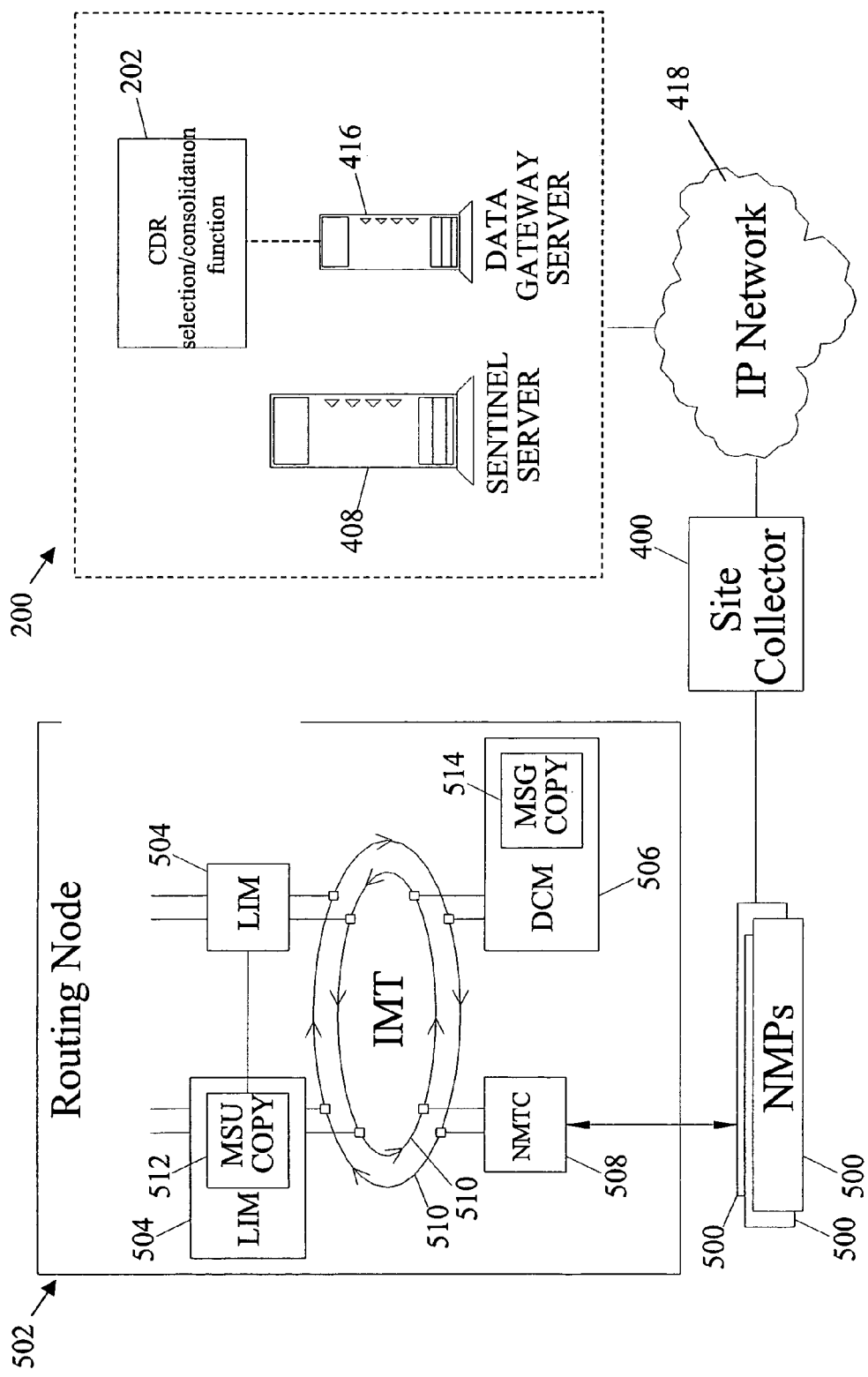
FIG. 11 is a network diagram illustrating a probeless network monitoring system architecture that includes CDR selection and consolidation functionality according to an embodiment of the subject matter described herein.

FIGS. 10 and 11 illustrate exemplary monitoring system architectures that are based on the Sentinel™ platform available from Tekelec of Calabasas, Calif. FIG. 10 illustrates a monitoring system architecture that collects signaling information from either discrete communication link probes or from an integrated signal transfer point/signaling gateway message copying interface. In FIG. 10, a pair of site collectors 400 collects and temporarily buffers monitored signaling messages. Site collectors 400 may be connected to external signaling link probes that passively copy signaling messages from SS7 signaling links or to network monitoring processors (NMPs) that receive and store signaling messages copied from signaling links within a routing node, such as an STP.

Each site collector 400 may be a general purpose computing platform including a microprocessor and one or more applications executing thereon. In the illustrated example, each site collector includes a filter application 402, a data capture application 404, and an MSU database 406. Filter application 402 filters received signaling messages based on filter criteria received from a Sentinel™ server 408. The filter criteria are preferably structured that the data captured by site collectors 400 is the superset of data required by billing application 410, fraud application 412, usage measurements application 414, and other network service applications that may be resident on data gateway server 416, or located elsewhere in the network.

Data capture applications 404 capture raw MSU data copied by the link monitors or NMPs. MSU databases 406 store MSUs captured by data capture application 404 and filtered by filter application 402.

Data gateway server 416 receives MSU data from the site collectors, generates CDRs based on the MSU data, and stores or buffers the CDRs. In the case of a multi-leg call, DGS 416 is adapted to produce and store a separate CDR for each monitored leg of the call. As such, multiple, uncorrelated CDR records associated with the same call may be generated and stored by DGS 416. In one embodiment, a correlation and consolidation function 202 associated with DGS 416 processes the stored CDRs using either single-CDR selection or consolidated CDR generation methods described above. The selected or generated CDR may then provided to network service applications that require a single CDR for a multi-leg call.

FIG. 11 is a block diagram illustrating a network monitoring system in which monitoring system 200 may be incorporated in more detail. In FIG. 11, site collector 400 is connected to network monitoring processors 500 that receive signaling messages copied from a routing node 502. In the illustrated example, routing node 502 is a signaling transfer point with a plurality of link interface modules 504, a data communications module 506, and a network monitoring transport card 508. Each module may include a printed circuit board with an application processor and a communications processor mounted thereon. Modules 504, 506, and 508 are connected to each other via a counter rotating dual ring bus 510. Link interface modules 504 send and receive SS7 signaling messages over SS7 signaling links and perform MTP3 routing functions. Link interface modules 504 also include MSU copy functions 512 for copying SS7 signaling messages received over SS7 signaling links for network monitoring purposes. DCM 506 sends and receives signaling messages over IP signaling links. DCM 506 may also include a message copy function 514 copying signaling messages received over IP signaling links. For example, message copy function 514 may copy SS7 signaling messages sent over IP signaling links or IP telephony signaling messages sent over IP signaling links for network monitoring purposes.

Network monitoring transport card 508 communicates messages copied from signaling links to network monitoring processors 500. When a message copy function 512 or 514 copies signaling messages from a signaling link, the message copy function broadcasts a service request to network monitoring processors 500 via network monitoring transport card 508. In response to the service request, the network monitoring processor provisioned to service the particular copy function establishes a TCP/IP connection with the message copy function via network monitoring transport card 508. The message copy function then sends copied MSUs to the network monitoring processor over the TCP/IP connection. Network monitoring processors 500 store signaling message copies and forward the copies to site collector 400. Site collector 400 filters the messages and transmits the messages to data gateway server 416 as described above. Data gateway server 416 receives MSU data from the site collectors, generates CDRs based on the MSU data, and stores or buffers the CDRs. In the case of a multi-leg call, DGS 416 may produce and store a separate CDR for each monitored leg of the call. As such, multiple, uncorrelated CDR records associated with the same call may be generated and stored by DGS 416. In one embodiment, correlation and consolidation function 202 associated with DGS 416 may process the stored CDRs using either single-CDR selection method or consolidated CDR generation method. The selected or generated CDR may then be provided to network service applications that require a single CDR for a multi-leg call.

Although the examples described above relate primarily to processing CDRs stored in a single database, such as the CDR database managed by data gateway server 416, the subject matter described herein is not limited to processing CDRs located in a single database. In an alternate implementation, the subject matter described herein may select a single CDR or generate a consolidated CDR from a plurality of different databases, or a single distributed database with data located in different geographic locations. For example, some network monitoring systems may generate and store CDRs at the link probes. In such an implementation, single CDR selection or consolidated CDR generation may be performed by analyzing the data located at each of the link probes.

It will be appreciated that various details of the invention may be changed without departing from the scope of the invention. Furthermore, the foregoing description is for the purpose of illustration only, and not for the purpose of limitation—the invention being defined by the claims.

What is claimed is:

1. A method for selecting a representative call detail record (CDR) from a plurality of CDRs associated with a call that involves a plurality of switching offices, the method comprising:
   (a) analyzing a plurality of CDRs, the plurality of CDRs including CDRs associated with different legs of a call that involves a plurality of switching offices and a plurality of legs;
   (b) determining an office type associated with each of the CDRs; and
   (c) selecting a CDR from the plurality of CDRs as a representative CDR associated with the call based on the office type.

2. The method of claim 1 wherein analyzing a plurality of CDRs includes analyzing a plurality of uncorrelated CDRs.

3. The method of claim 1 wherein analyzing a plurality of CDRs includes analyzing a plurality of correlated CDRs.

4. The method of claim 1 wherein analyzing a plurality of CDRs includes analyzing a plurality of CDRs stored in a single geographic location.

5. The method of claim 1 wherein analyzing a plurality of CDRs includes analyzing a plurality of CDRs stored in a plurality of different geographic locations.

6. The method of claim 1 wherein determining an office type associated with each of the CDRs includes determining an office type based on an originating address associated with each of the CDRs.

7. The method of claim 6 wherein the originating address includes an originating signaling system 7 (SS7) point code associated with the CDRs.

8. The method of claim 1 wherein selecting a CDR from the plurality of CDRs as a representative CDR includes selecting a CDR having an originating point code that is not associated with a tandem office.

9. The method of claim 1 wherein selecting a CDR from the plurality of CDRs as a representative CDR includes selecting a CDR associated with an originating end office.

10. The method of claim 1 wherein selecting a CDR from the plurality of CDRs as a representative CDR includes selecting a CDR associated with a combined class of 4/5 tandem office.

11. The method of claim 1 wherein selecting a CDR from the plurality of CDRs as a representative CDR includes selecting a CDR having an originating point code that is associated with a tandem office and that includes a calling party number (CdPN) and a called party number (CgPN) in a tandem NPA-NXX list.

12. A method for identifying and combining call detail records (CDRs) produced for different legs of the same call, the method comprising:
   (a) determining an office type associated with a first CDR of a plurality of CDRs collected from different monitoring locations;
   (b) determining whether the office type indicates that a call associated with the first CDR is a multi-leg call; and
   (c) in response to determining that the call is a multi-leg call, locating at least one additional CDR associated with the call and combining the at least one additional CDR with the first CDR to produce a consolidated CDR for the multi-leg call.

13. The method of claim 12 wherein determining whether the office type indicates a multi-leg call includes determining whether the first CDR includes a point code associated with a tandem office.

14. The method of claim 13 wherein locating the at least one additional CDR includes:
   (a) extracting a calling party number (CgPN) and a called party number (CdPN) from the first CDR; and
   (b) searching for CDRs that include the CgPN and CdPN.

15. The method of claim 14 wherein searching for CDRs that include the CgPN and CdPN includes searching for CDRs within a predetermined time range of the first CDR.

16. The method of claim 12 wherein locating the at least one CDR includes determining whether the first CDR includes number portability information, and, in response, using the number portability information to locate the at least one additional CDR.

17. The method of claim 16 wherein the number portability translation information includes a generic address parameter (GAP) value.

18. The method of claim 12 wherein locating the at least one additional CDR includes extracting a CdPN from the first CDR and searching a listing of tandem NPA-NXX values that include LRN values for the tandem office.

19. The method of claim 12 wherein generating a consolidated CDR includes tagging each CDR related to the call with a correlation parameter.

20. The method of claim 12 wherein generating a consolidated CDR includes generating a super CDR record that includes information associated with some or all of the CDR records related to the call.

21. The method of claim 12 wherein the first CDR includes number portability translation information.

22. The method of claim 21 wherein the number portability translation information includes a location routing number.

23. The method of claim 21 wherein the number portability translation information includes a generic address parameter.

24. The method of claim 21 wherein the number portability translation information includes a jurisdiction information parameter.

25. A method for selecting a representative CDR from a plurality of CDRs associated with a call that involves a plurality of switching offices and a number portability translation, the method comprising:
   (a) analyzing a plurality of CDRs generated from messages collected at a plurality of different monitoring locations;
   (b) determining whether a plurality of CDRs exists for different legs of the same call; and
   (c) in response to determining that a plurality of CDRs exists for different legs of the same call, locating the CDRs and selecting a representative CDR from the plurality of CDRs, wherein selecting a representative CDR includes selecting a CDR that includes number portability translation information.

26. A system for selecting a single call detail record (CDR) from a plurality of call detail records (CDRs) associated with a call that involves a plurality of switching offices and a plurality of legs, the system comprising:
   (a) at least one database for storing a plurality of CDR records; and
   (b) a selection/consolidation function for:
      (i) analyzing the CDR records in the at least one database;
      (ii) determining an office type associated with each CDR; and
      (iii) selecting a representative CDR for the call based on the office type.

27. The system of claim 26 wherein, in selecting a representative CDR for the call based on the office type, the selection/consolidation function is adapted to select a CDR that does not have an originating point code associated with a tandem office.

28. The system of claim 26 wherein, in selecting a representative CDR, the selection/consolidation function is adapted to select a CDR associated with an originating end office.

29. The system of claim 26 wherein, in selecting a representative CDR, the selection/consolidation function is adapted to select a CDR having an originating point code that is associated with a tandem office and that includes a calling party number (CdPN) and called party number (CgPN) and a called party (in a tandem NPA-NXX list).

30. The system of claim 26 wherein, in selecting a representative CDR, the selection/consolidation function is adapted to select a CDR having an originating point code that is associated with a combination class 4/5 office.

31. The system of claim 26 wherein the selection/consolidation function is adapted to provide the selected representative CDR to a network service application.

32. A system for correlating a plurality of call detail records (CDRs) associated with a call that involves a plurality of switching offices and a plurality of legs and for generating a CDR that is representative of the call, the system comprising:
   (a) at least one database that includes a plurality of CDR records; and
   (b) a selection/consolidation function for:
      (i) accessing a CDR record that is contained in the at least one database;
      (ii) using an office type to determine whether the CDR is associated with a call that includes a plurality of legs;
      (iii) in response to identifying the CDR as being associated with a call that includes a plurality of legs, using information contained in the CDR to locate additional CDR records associated with the call; and
      (iv) generating a consolidated CDR that contains information associated with at least some of the CDR records associated with the multi-leg call.

33. The system of claim 32 wherein the selection/consolidation function is adapted to provide the consolidated CDR to a network service application.

34. The system of claim 32 wherein the selection/consolidation function is adapted to use a called party identifier in locating additional CDR records associated with the call.

35. The system of claim 32 wherein the selection/consolidation function is adapted to use a calling party identifier in locating additional CDR records associated with the multi-leg call.

36. The system of claim 32 wherein the selection/consolidation function is adapted to use time stamp information in locating additional CDR records associated with the multi-leg call.

37. The system of claim 32 wherein the selection/consolidation function is adapted to use a generic address parameter (GAP) value in locating additional CDR records associated with the multi-leg call.

38. The system of claim 32 wherein the selection/consolidation function is adapted to identify the CDR as being associated with a multi-leg call based on whether a called party number value or a calling party number value contained in the CDR are serviced by the switching office associated with an originating address associated with the CDR.

39. The system of claim 32 wherein the selection/consolidation function is adapted to tag each CDR related to the multi-leg call with a correlation parameter in generating the consolidated CDR.

40. The system of claim 32 wherein the consolidated CDR includes a super CDR record that includes information associated with some or all of the CDR records related to the multi-leg call.

41. The system of claim 32 wherein the consolidated CDR includes number portability translation information.

42. The system of claim 41 wherein the number portability translation information includes a location routing number.

43. The system of claim 41 wherein the number portability translation information includes a generic address parameter.

44. The system of claim 41 wherein the number portability translation information includes a jurisdiction information parameter.

45. A system for correlating a plurality of call detail records (CDRs) associated with a call that involves a plurality of legs and a plurality of switching offices and for selecting a CDR that is representative of the call, the system comprising:
   (a) at least one database for storing a plurality of CDR records; and
   (b) a correlation and consolidation function for:
      (i) analyzing the CDR records in the at least one database;
      (ii) determining whether a plurality of CDRs exists for different legs of the same call; and
      (iii) in response to determining that a plurality of CDRs exists for different legs of the same call, selecting a CDR from the plurality of CDRs that includes number portability translation information.

46. A computer program product comprising computer executable instructions embodied in a computer readable medium for performing steps comprising:
   (a) analyzing a plurality of CDRs, the plurality of CDRs including CDRs associated with different legs of a call that involves a plurality of switching offices and a plurality of legs;
   (b) determining an office type associated with each of the CDRs; and
   (c) selecting a CDR from the plurality of CDRS as a representative CDR associated with the call based on the office type.

47. A computer program product comprising computer executable instructions embodied in a computer readable medium for performing steps comprising:
   (a) determining an office type associated with a first CDR of a plurality of CDRs collected from different monitoring locations;
   (b) determining whether the office type indicates that a call associated with the first CDR is a multi-leg call; and
   (c) in response to determining that the call is a multi-leg call, locating at least one additional CDR associated with the call and combining the at least one additional CDR with the first CDR to produce a consolidated CDR for the multi-leg call.

48. A computer program product comprising computer executable instructions embodied in a computer readable medium for performing steps comprising:
   (a) analyzing a plurality of CDRs generated from messages collected at a plurality of different monitoring locations;

(b) determining whether a plurality of CDRs exists for different legs of the same call; and
(c) in response to determining that a plurality of CDRs exists for different legs of the same call, locating the CDRs and selecting a representative CDR from the plurality of CDRs, wherein selecting a representative CDR includes selecting a CDR that includes number portability translation information.

* * * * *